United States Patent
Huh

(10) Patent No.: US 10,602,559 B2
(45) Date of Patent: Mar. 24, 2020

(54) METHOD FOR ESTABLISHING CONNECTION BETWEEN DEVICES

(71) Applicant: SAMSUNG ELECTRONICS CO., LTD., Suwon-si (KR)

(72) Inventor: Mi-suk Huh, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/740,069

(22) PCT Filed: May 23, 2016

(86) PCT No.: PCT/KR2016/005434
§ 371 (c)(1),
(2) Date: Dec. 27, 2017

(87) PCT Pub. No.: WO2017/003096
PCT Pub. Date: Jan. 5, 2017

(65) Prior Publication Data
US 2018/0192460 A1    Jul. 5, 2018

(30) Foreign Application Priority Data
Jul. 1, 2015 (KR) .................. 10-2015-0094006

(51) Int. Cl.
*H04W 76/14* (2018.01)
*H04W 76/10* (2018.01)
(Continued)

(52) U.S. Cl.
CPC ........... *H04W 76/14* (2018.02); *H04W 4/023* (2013.01); *H04W 8/005* (2013.01);
(Continued)

(58) Field of Classification Search
CPC ....... H04L 67/12; H04L 67/125; H04L 67/10; H04W 4/38; H04W 4/80; H04W 84/18; H04W 76/10
See application file for complete search history.

(56) References Cited

U.S. PATENT DOCUMENTS 8,725,113 B2    5/2014   Gargi et al.
8,732,319 B2    5/2014   Tian
(Continued)

FOREIGN PATENT DOCUMENTS

CN    101005701 A    7/2007
CN    103987038 A    8/2014
(Continued)

OTHER PUBLICATIONS

Communication dated Aug. 23, 2016 by the International Searching Authority in counterpart International Patent Application No. PCT/KR2016/005434. (PCT/ISA/210).
(Continued)

*Primary Examiner* — Michael J Moore, Jr.
(74) *Attorney, Agent, or Firm* — Sughrue Mion, PLLC

(57) ABSTRACT

A method performed by a first device to establish a connection to a second device includes: obtaining identification information of the second device by using a first communication method; obtaining the identification information of the second device by using a second communication method; obtaining first distance information regarding the second device based on characteristics of the first communication method and the second communication method; and determining whether to transmit a connection request to the second device based on the obtained first distance information.

14 Claims, 26 Drawing Sheets

(51) Int. Cl.

| | | |
|---|---|---|
| | *H04W 88/02* | (2009.01) |
| | *H04W 12/00* | (2009.01) |
| | *H04W 76/23* | (2018.01) |
| | *H04W 4/02* | (2018.01) |
| | *H04W 8/00* | (2009.01) |
| | *H04W 88/04* | (2009.01) |
| | *H04W 92/18* | (2009.01) |
| | *H04W 72/04* | (2009.01) |
| | *H04W 84/18* | (2009.01) |

(52) U.S. Cl.
CPC ......... *H04W 12/003* (2019.01); *H04W 76/10* (2018.02); *H04W 76/23* (2018.02); *H04W 88/02* (2013.01); *H04W 88/04* (2013.01); *H04W 92/18* (2013.01); *H04W 12/00503* (2019.01); *H04W 72/0406* (2013.01); *H04W 84/18* (2013.01)

(56) References Cited

U.S. PATENT DOCUMENTS

| | | | |
|---|---|---|---|
| 8,774,041 B2 | 7/2014 | Akay et al. | |
| 9,271,314 B2 | 2/2016 | Koh et al. | |
| 9,338,633 B2 | 5/2016 | Choi et al. | |
| 10,248,399 B2* | 4/2019 | Yoon | G06F 8/61 |
| 2007/0232357 A1 | 10/2007 | Takasu | |
| 2012/0045994 A1 | 2/2012 | Koh et al. | |
| 2012/0063598 A1* | 3/2012 | Huh | H04L 63/061 |
| | | | 380/270 |
| 2013/0324081 A1 | 12/2013 | Gargi et al. | |
| 2014/0269610 A1 | 9/2014 | Hiben et al. | |
| 2015/0029880 A1 | 1/2015 | Burns et al. | |
| 2015/0111500 A1* | 4/2015 | Koh | H04L 63/0492 |
| | | | 455/41.2 |
| 2015/0245186 A1* | 8/2015 | Park | H04W 4/80 |
| | | | 455/417 |
| 2015/0358777 A1* | 12/2015 | Gupta | H04L 12/2807 |
| | | | 370/254 |
| 2016/0226732 A1* | 8/2016 | Kim | H04L 12/2807 |
| 2016/0295364 A1* | 10/2016 | Zakaria | H04W 4/023 |

FOREIGN PATENT DOCUMENTS

| | | |
|---|---|---|
| KR | 10-2009-0077230 A | 7/2009 |
| KR | 10-2011-0125695 A | 11/2011 |
| KR | 10-2012-0017617 A | 2/2012 |
| WO | 2011/154956 A1 | 12/2011 |
| WO | 2015/081816 A1 | 6/2015 |

OTHER PUBLICATIONS

Communication dated Aug. 23, 2016 by the International Searching Authority in counterpart International Patent Application No. PCT/KR2016/005434. (PCT/ISA/237).

Communication dated Mar. 2, 2018 by the European Patent Office in counterpart European Patent Application No. 16818129.5.

Communication dated Jul. 4, 2019, issued by the Korean Intellectual Property Office in counterpart Korean Patent Application No. 10-2015-0094006.

Communication dated Nov. 4, 2019 issued by the State Intellectual Property Office of P.R. China in counterpart Chinese Application No. 201680039154.9.

\* cited by examiner

RELATED ART

RELATED ART

METHOD FOR ESTABLISHING CONNECTION BETWEEN DEVICES

TECHNICAL FIELD

The present disclosure relates to methods of establishing a connection between devices, and more particularly, to methods and devices for establishing a connection between devices according to distances therebetween.

BACKGROUND ART

With the development of the Internet of Things (IoT), it is possible to connect devices to one another over a network to share information. However, establishing a connection between devices requires a lot of user inputs, and there is a problem that security becomes weak when the number and types of devices that may be connected to one another increase.

FIGS. 1A and 1B illustrate a method of establishing a connection between devices according to the prior art. Referring to FIG. 1A, Jane's terminal 10 searches for a device within a predetermined range to establish a connection to Tom's terminal 20. Jane's terminal 10 displays identification information of at least one terminal and receives a user input to select identification information corresponding to Tom's terminal 20 from a user who verified the displayed information. Jane's terminal 10 establishes the connection to Tom's terminal 20 based on the received user input.

Referring to FIG. 1B, Jane's terminal 10 exchanges key data to establish the connection to the Tom's terminal 20. Jane's terminal 10 and Tom's terminal 20 establish the connection to each other by receiving an input from the user regarding the exchanged key data.

However, when the identification information of Tom's terminal 20 is displayed as a name that is difficult to be recognized by the user or identification information of other similar terminals is displayed together with the identification information of Tom's terminal 20, it is difficult for the user to easily select a device to be connected to. Also, even if Tom's terminal 20 is located near Jane's terminal 10, another inconvenience occurs as the user may establish the connection only by taking a separate action with regard to Jane's terminal 10 and Tom's terminal 20. Further, according to the related art, there have been problems as such a connection is vulnerable to an MITM attack via the same communication method and connection establishment procedure irrespective of a distance between the devices, and load of a server increases by indiscreetly transmitting information of a device to establish a connection to the server.

DETAILED DESCRIPTION OF THE INVENTION

Technical Solution

Some embodiments of the present disclosure provide a method performed by a first device to establish a connection to a second device, the method including: obtaining identification information of the second device by using a first communication method; obtaining the identification information of the second device by using a second communication method; obtaining first distance information regarding the second device based on characteristics of the first communication method and the second communication method; and determining whether to transmit a connection request to the second device based on the obtained first distance information.

The obtaining of the first distance information may include: obtaining first distance information regarding the second device based on a time when the identification information of the second device is obtained by using the first communication method and a time when the identification information of the second device is obtained by using the second communication method.

The determining whether to transmit the connection request may include: determining whether the second device is located within a predetermined distance range based on the obtained first distance information; and transmitting the connection request to the second device based on a determining result.

The transmitting of the connection request may include simultaneously transmitting the connection request by using the first communication method and the second communication method.

The determining may include: when the second device is a plurality of second devices, comparing identification information of each of the plurality of second devices obtained by using the first communication method with identification information of each of the plurality of second devices obtained by using the second communication method; and selecting one of the plurality of second devices based on a comparing result.

The determining may include: determining whether the second device is located within a predetermined distance range based on the obtained first distance information; determining whether a connection establishment with the second device located within the predetermined distance range is necessary based on a service providing method to be used by the second device; and selectively transmitting the identification information of the second device to an external server based on a determining result.

The method may further include: receiving a response to the connection request from the second device; and establishing a connection to the second device based on the received response.

The receiving of the response may include: transmitting information necessary for a connection establishment to the second device based on the received response.

The receiving of the response may include: transmitting first key data to the second device by using each of the first communication method and the second communication method based on the received response; and receiving second key data from the second device by using each of the first communication method and the second communication method.

The establishing of the connection may include: determining whether to establish a connection to the second device based on the first key data and the second key data.

The determining whether to establish the connection may include: obtaining second distance information regarding the second device based on a time when the second key data is received by using the first communication method and a time when the second key data is received by using the second communication method; comparing the obtained first distance information with the second distance information; and determining whether to establish the connection based on a comparing result.

The method may further include obtaining a representative authority for connection establishment from a third device to which a connection is established; and transmitting the identification information and the first distance information of the second device to the third device.

The method may further include: obtaining a representative authority for connection establishment from a third device to which a connection is established.

The determining may include: determining whether a connection establishment between the second device located within a predetermined distance range and the third device is necessary based on the obtained representative authority; and selectively transmitting the first distance information and the identification information of the second device to the third device based on a determining result.

The method may further include receiving at least one of identification information of at least one device selected by the third device or information necessary for establishing a connection with the at least one device selected by the third device.

The determining whether the connection establishment between the second device and the third device is necessary may include: obtaining third key data from the third device; transmitting the third key data to the second device by using each of the first communication method and the second communication method; receiving fourth key data from the second device by using each of the first communication method and the second communication method; and determining whether to establish the connection between the second device and the third device based on the third key data and the fourth key data.

The second communication method may include a communication method using a sound input unit and a sound output unit.

The second communication method may include a communication method using ultrasonic waves.

The second communication method may include a communication method using directional sound.

The method may further include periodically obtaining distance information with the second device after establishing the connection; and disconnecting the established connection with the second device based on the periodically obtained distance information.

Some embodiments of the present disclosure provide a method performed by a second device to establish a connection to a first device, the method including: providing identification information of the second device to the first device by using a first communication method and a second communication method; receiving a connection request from the first device by using the first communication method and the second communication method; obtaining distance information regarding the first device based on characteristics of the first communication method and the second communication method; determining whether to establish a connection to the first device based on the obtained distance information; and establishing a connection to the first device based on a determining result.

Some embodiments of the present disclosure provide a method of establishing a connection with a second device performed by a third device through a first device, the method including: providing a representative authority for connection establishment to a first device; obtaining first identification information of the second device from the second device; obtaining second identification information of the second device from the first device and distance information between the first device and the second device; comparing the first identification information and the second identification information; and selectively establishing a connection with the second device based on a result of comparing and the distance information.

Some embodiments of the present disclosure provide a non-transitory computer-readable recording medium having recorded thereon a program which, when executed by a computer, performs the method.

Some embodiments of the present disclosure provide a first device for establishing a connection with a second device, the first device including: a communicator including a first communication interface configured to obtain identification information of the second device by using a first communication method and a second communication interface configured to obtain the identification information of the second device by using a second communication method; and a controller configured to obtain first distance information regarding the second device based on characteristics of the first communication method and the second communication method and determine whether to transmit a connection request to the second device based on the obtained first distance information.

The controller may obtain first distance information with the second device based on a time at which the identification information of the second device is obtained by using the first communication method and a time at which the identification information of the second device is obtained by using the second communication method.

The controller may determine whether the second device is located within a predetermined range of distance based on the obtained first distance information and the communicator may transmit a connection request to the second device based on determining.

The communicator may simultaneously transmit the connection request through a first communication interface and a second communication interface.

When the second device is a plurality of second devices, the controller may compare identification information of each of the plurality of second devices obtained by using the first communication method and identification information of each of the plurality of second devices obtained by using the second communication method and select one of the plurality of second devices based on a result of comparing.

The controller may determine whether the second device is located within the predetermined range of distance based on the obtained first distance information and determine whether a connection establishment with the second device located within the predetermined distance range is necessary based on a service providing method to be provided to the second device and the communicator may selectively transmit the identification information of the second device to an external server based on determining.

The communicator may receive a response to the connection request from the second device and establish a connection with the second device based on the received response.

The communicator may transmit information necessary for the connection establishment to the second device based on the received response.

The first communication interface and the second communication interface may transmit first key data to the second device and receive second key data from the second device based on the received response, and the controller may determine whether to establish the connection with at least one second device that has received the response based on the first key data and the second key data.

The controller may obtain second distance information with the at least one second device based on a time at which the second key data is received by using the first communication method and a time at which the second key data is obtained by using the second communication method, compare the obtained first distance information with the second distance information, and determine whether to establish the connection based on a result of comparing.

The communicator may obtain a representative authority for connection establishment from a third device to which a connection is established, and may transmit the identification information of the second device and the first distance information to the third device.

The communicator may obtain the representative authority for connection establishment from the third device to which the connection is established, the controller may determine whether a connection establishment between the second device located within the predetermined range of distance and the third device is necessary based on the obtained authority, and the communicator may selectively transmit the first distance information and the identification information of the second device to the third device based on determining.

The communicator may receive at least one of identification information of at least one device selected by the third device or information necessary for establishing a connection with the at least one device selected by the third device.

The communicator may obtain third key data from the third device and transmit the third key data to the second device through the first communication interface and the second communication interface, receive fourth key data from the second device, and the controller may determine whether to establish a connection between the at least one second device and the third device based on the third key data and the fourth key data.

The second communication interface may include a sound input unit and a sound output unit.

The second communication interface may perform communication using ultrasonic waves.

The second communication interface may perform communication using directional sound.

The communicator may periodically obtain distance information from the second device after the connection establishment, and the controller may release the established connection with the second device based on the periodically obtained distance information.

Some embodiments of the present disclosure provide a second device for establishing a connection with a first device, the second device including: a communicator including a first communication interface configured to provide identification information of the second device to the first device and receive a connection request from the first device and a second communication interface configured to provide identification information of the second device to the first device and receive the connection request from the first device; and a controller configured to determine whether to establish a connection with the first device based on obtained distance information, wherein the communicator establishes the connection with the first device based on determining.

Some embodiments of the present disclosure provide a third device for establishing a connection with a second device through a first device, the third device including: a communicator configured to provide a representative authority for connection establishment to the first device, obtain first identification information of the second device from the second device, and obtain second identification information of the second device and distance information between the first device and the second device from the first device; and a controller configured to compare the first identification information and the second identification information, wherein the communicator may selectively establish the connection with the second device based on a result of comparing and the distance information.

ADVANTAGEOUS EFFECTS OF THE INVENTION

Embodiments of the present disclosure provide an intuitive connection establishment method between devices, and more particularly, provide a method of establishing a connection between devices capable of providing a convenient and differentiated service to a user when establishing the connection between the devices.

BEST MODE

Figure 1A:
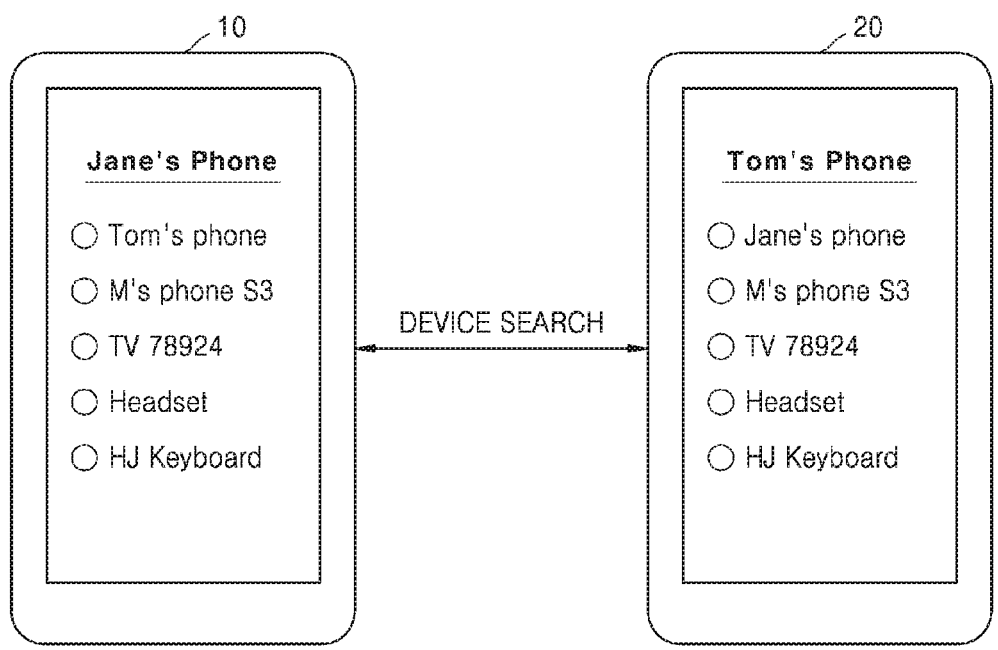
FIGS. 1A and 1B illustrate a method of establishing a connection according to the prior art.
Figure 1B:
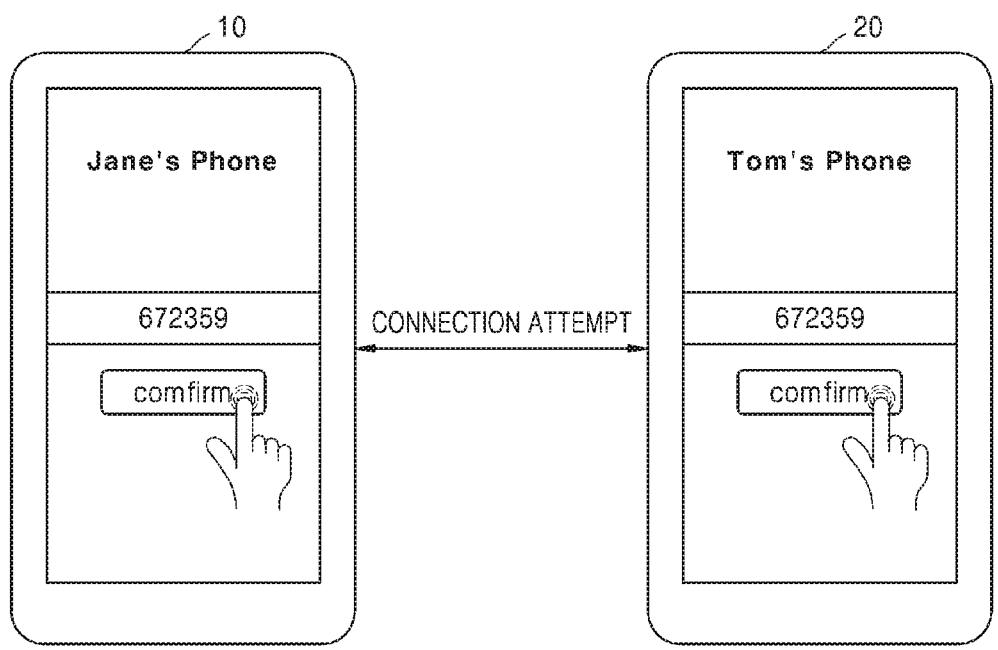

All terms including descriptive or technical terms which are used herein should be construed as having meanings that are obvious to one of ordinary skill in the art. However, the terms may have different meanings according to the intention of one of ordinary skill in the art, precedent cases, or the appearance of new technologies. Also, some terms may be arbitrarily selected by the applicant, and in this case, the meaning of the selected terms will be described in detail in the detailed description of the invention. Thus, the terms used herein have to be defined based on the meaning of the terms together with the description throughout the specification.

Throughout the specification, when a region is "connected" to another region, the regions may be not only "directly connected", but also "electrically connected" via another device therebetween. Also, when a region "includes" an element, the region may further include another element instead of excluding the other element, otherwise differently stated. In the following description, terms such as "unit" and "module" indicate a unit for processing at least one function or operation, wherein the unit and the block may be embodied as hardware or software or embodied by combining hardware and software.

Throughout the specification, examples of a device may include a personal computer, a cellular phone, a smart phone, a television (TV), a tablet computer, a laptop, a personal digital assistant (PDA), a portable multimedia player (PMP), a navigation device, an MP3 player, a digital camera, a refrigerator, a washing machine, a cleaner, etc., but are not limited thereto, and the device may vary.

Throughout the specification, a communication method may include all communication methods such as a predetermined communication standard, a predetermined frequency band, a predetermined protocol, or a communication via a predetermined channel. For example, the communication method may include Bluetooth, BLE, Wi-Fi, Zigbee, 3G, LTE, a communication method using ultrasound, etc., and may include short-range communication, long-range communication, wireless communication and wired communication. The present disclosure is not limited to the above example.

Throughout the specification, a short-range communication method may denote a communication method in which communication is possible only when two devices are within a certain range, and for example, may include Bluetooth or near field communication (NFC).

Throughout the specification, a long-range communication method may denote a communication method in which two devices may communicate regardless of a distance. For example, the long-range communication method may denote a method in which two devices may communicate more than a predetermined distance through a repeater, such as an AP, and may include a communication method using a cellular network such as an SMS or a telephone. The present disclosure is not limited to the example described above, and may include all communication methods except for the short-range communication method.

Throughout the specification, identification information of a device may include all information capable of identifying the device. For example, the identification information of the device may include a MAC address, device information of the device, a telephone number, a TCP/IP address, data generated by the device, and the like and is not limited to the above example.

Throughout the specification, establishing a connection may refer to a state in which devices are connected to each other so as to perform data communication. According to some embodiments, a connection may mean a means connected to perform communication between devices, such as a channel, a link, and a session, and establishment may mean an operation of forming and setting up a predetermined channel, a link, and a session. In other words, establishing a connection may be synonymous with formation of a channel, a link and a session, or setup of a channel, a link and a session.

Throughout the specification, a connection establishment procedure or a connection establishment method may refer to a procedure performed between devices before establishing a connection, so as to establish a connection between the devices. According to some embodiments, the connection establishment procedure or the connection establishment method may have the same meaning as a connection setup procedure.

Throughout the specification, key data may include both a public key (an asymmetric key) and a secret key (a symmetric key). The key data may refer to data used for encryption communication, and may include data used when setting up a channel for encryption communication. The key data may be generated through a key operation algorithm stored in a device. The key operation algorithm may include various algorithms such as AES, MD5, and ECDH, and is not limited to the above example. Since the key operation algorithm is obvious to one of ordinary skilled in the art, a detailed description thereof will be omitted.

Throughout the specification, an exchange of key data may mean a procedure in which a first device and a second device transmit/receive at least one of a key of the first device or a key of the second device. That is, the exchange of key data may mean a process of transmitting and receiving keys of two devices between the two devices.

Throughout the specification, a service may include any type of service. Also, service information may include all information provided to provide a service, such as advertisement information, content, and transaction information, or during service provision. The present disclosure is not limited to the above example.

Figure 2A:
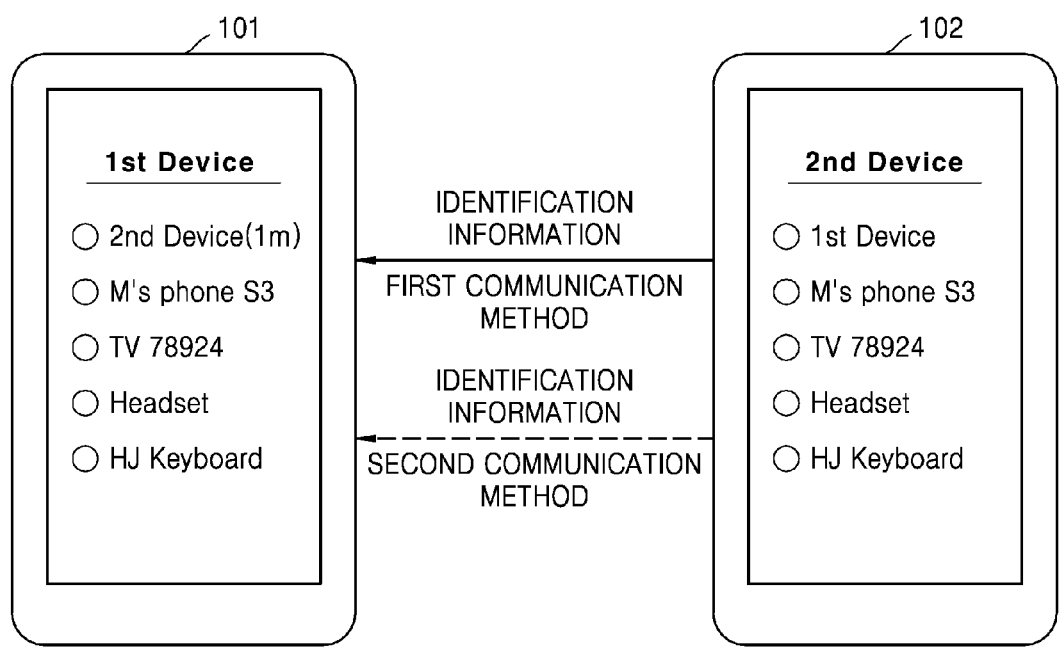
FIGS. 2A through 2C illustrate a connection establishment and service provision system between devices depending on a distance according to some embodiments.
Figure 2B:
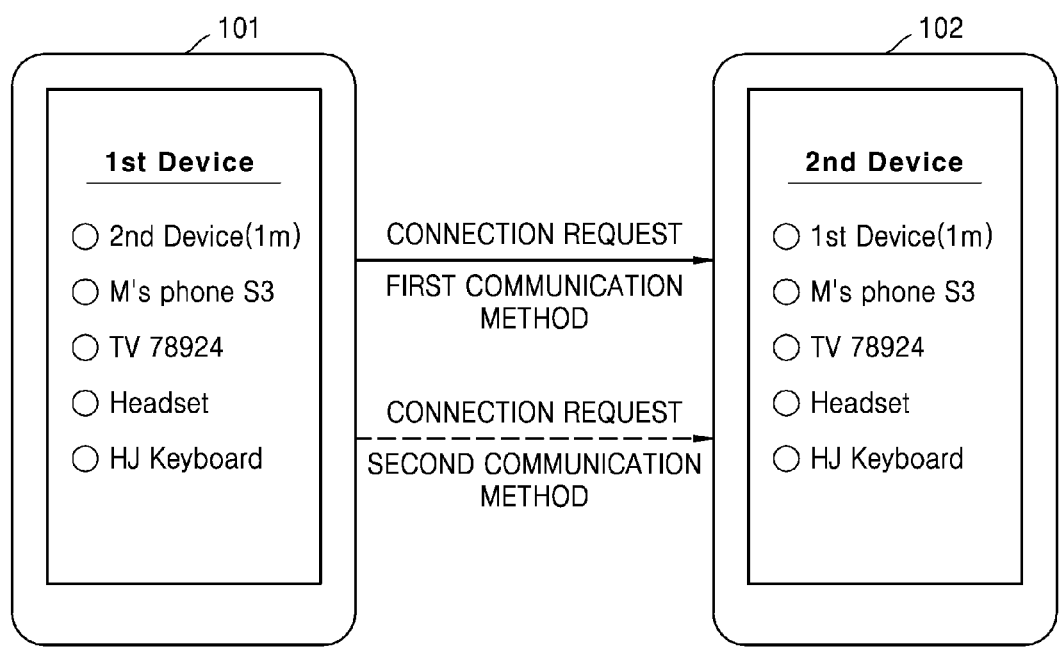
Figure 2C:
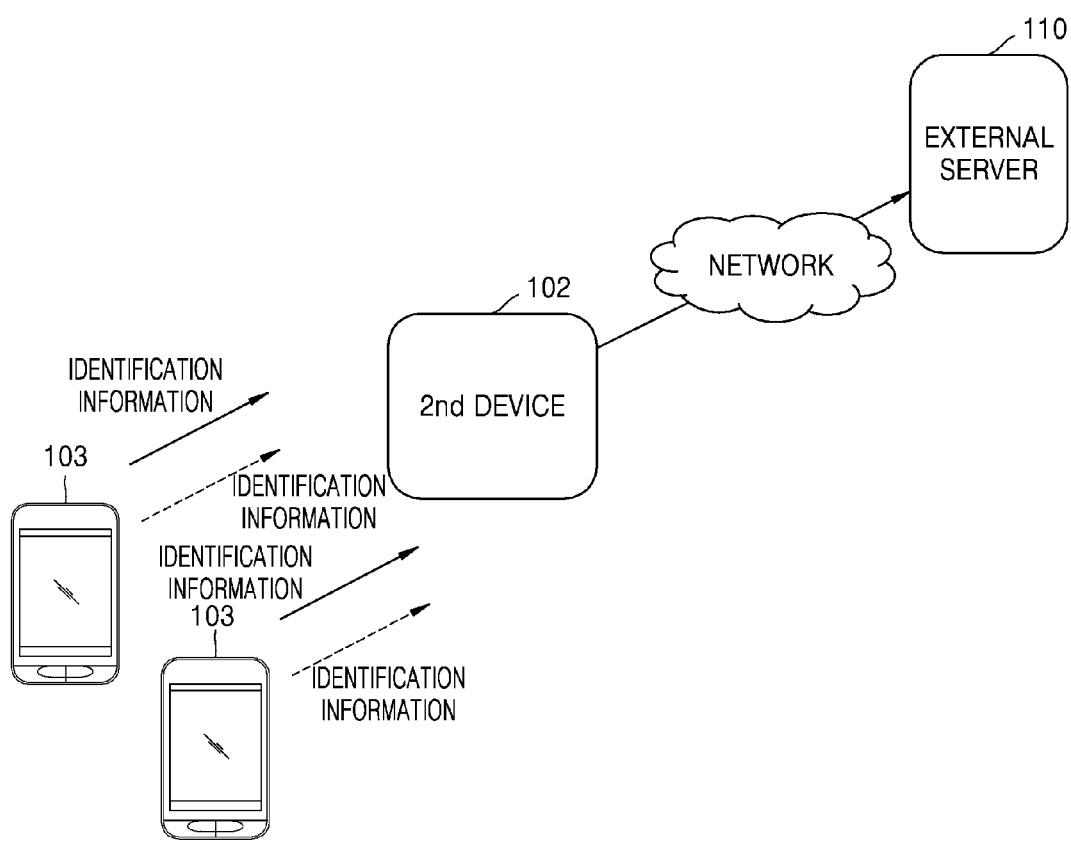

FIGS. 2A through 2C illustrate a connection establishment and service provision system between devices depending on distance according to some embodiments.

Referring to FIG. 2A, a first device 101 may obtain second identification information from a second device 102 by using a first communication method and a second communication method. According to some embodiments, the first device 101 may obtain identification information of the second device 102 by using each of the first communication method and the second communication method.

According to some embodiments, the first device 101 may broadcast or advertise identification information of the first device 101 to the second device 102. Also, according to some embodiments, the first device 101 may broadcast or advertise the identification information of the first device 101 and the identification information of the second device 102 to the second device 102 by using the first communication method and the second communication method, respectively. Also, according to some embodiments, the second device 102 may be a plurality of devices.

According to some embodiments, the second device 102 may simultaneously transmit the identification information of the second device 102 to the first device 101 using the first communication method and the second communication method. Since the first communication method and the second communication method are different from each other, a time at which the identification information of the second device 102 transmitted by using the first communication method is received by the first device 101 and a time at which the identification information of the second device 102 transmitted by using the second communication method is received by the first device 101 may be different from each other.

According to some embodiments, the first device 101 may obtain distance information with the second device 102 based on characteristics of the first communication method and the second communication method.

According to some embodiments, since the first device 101 may be informed of a data transfer speed by using the first communication method and the second communication method (for example, speed of a communication method based on a frequency band used by the first communication method and the second communication method) and the time at which the identification information of the second device 102 is received by using the first communication method and the second communication method, the first device 101 may obtain information about the distance between the first device 101 and the second device 102. For reference, in FIG. 2A, communication using the first communication method is indicated by a solid line, and communication using the second communication method is indicated by a dotted line. According to some embodiments, the first device 101 may obtain distance information with the second device 102 in a device discovery procedure or a connection setup procedure. That is, the first device 101 may obtain distance information with the second device 102 before establishing a connection with the second device 102 and may determine whether to establish the connection with the second device 102 based on the obtained distance information. This will be described in detail in FIGS. 2A to 23 below.

According to some embodiments, the first device 101 may determine whether to establish the connection with the second device 102 according to the obtained distance information. For example, the first device 101 may establish the connection with the second device 102 located within a predetermined distance or establish the connection with the second device 102 closest to the first device 101. The present disclosure is not limited to the above example.

Also, according to some embodiments, the first device 101 may establish the connection with the second device 102 without receiving a user input. In other words, the first device 101 may automatically establish the connection with the second device 102 based on the distance information.

According to some embodiments, when there are a plurality of second devices, the first device 101 may obtain identification information from each of the plurality of second devices. Also, the first device 101 may obtain identification information of each of the plurality of second devices from the plurality of second devices using the first communication method and the second communication method. The first device 101 may select one of the plurality of second devices according to the obtained distance information with the plurality of second devices and a predetermined reference and establish the connection with the selected second device 102.

If the first device 101 determines to establish the connection with the second device 102, the first device 101 may transmit a connection request to the second device 102 as shown in FIG. 2B. According to some embodiments, the first device 101 may transmit the connection request to the second device 102 using each of the first communication method and the second communication method. In FIG. 2B, communication using the first communication method is indicated by a solid line and communication using the second communication method is indicated by a dotted line.

The second device 102 may obtain distance information with the first device 101 by using a method corresponding to the method in which the first device 101 obtains the distance information with the second device 102 described in FIG. 2A. For example, the second device 102 may obtain the connection request, the key data, and the identification information transmitted by the first device 101 using each of the first communication method and the second communication method, thereby obtaining the obtain distance information with the first device 101.

According to some embodiments, the second device 102 may transmit a response to the connection request of the first device 101 or accept the connection request, based on the obtained distance information, thereby establishing the connection with the first device 101. Also, the first device 101 may provide the distance information with the second device 102 obtained in FIG. 2A to the second device 102.

According to some embodiments, the second device 102 may determine whether to accept the connection request of the first device 101 or establish the connection without receiving a user input. For example, when the first device 101 is located within a predetermined range, the second device 101 may automatically establish the connection with the first device 101 without receiving the user input. This is the same as that described with reference to FIG. 2A, and thus a detailed description thereof will be omitted.

According to some embodiments, the first device 101 and the second device 102 may automatically establish the connection therebetween based on the distance information therebetween, without receiving a user input. For example, the first device 101 may automatically perform a connection establishment procedures with the second device 102 located within a predetermined distance range.

FIG. 2C shows a system in which the second device 102 provides a service to the first device 101 or a third device 103 by providing identification information of the first device 101 or the third device 103 to an external server 110.

According to some embodiments, the second device 102 is a device that collects information of various devices for providing services such as an access point (AP), a receiver, and a hub.

The first device 101 or the third device 103 may use the service by establishing a direct connection with the second device 102 or by providing the identification information of the first device 101 or the third device 103 to the external server 110 through the second device 102.

Referring to FIG. 2C, the first device 101 or the third device 103 may provide the identification information to the second device 102. According to some embodiments, the first device 101 or the third device 103 may provide the identification information to the second device 102 using a first communication method and a second communication method. In FIG. 2C, communication using the first communication method is indicated by a solid line and communication using the second communication method is indicated by a dotted line.

According to some embodiments, the second device 102 may obtain distance information with the first device 101 or the third device 103 based on characteristics of the first communication method and the second communication method. The second device 102 may transmit the identification information to the external server 110 based on the distance information. This is the same as that described above with reference to FIGS. 2A and 2B, and thus a detailed description thereof will be omitted.

The first device 101 or the third device 103 may periodically broadcast or advertise the identification information.

However, when the second device 102 transmits the identification information of the first device 101 and the third device 103 to the external server 110 regardless of the distance information, even if the first device 101 and the third device 103 do not want to receive the service and thus get away from the second device 102, since the external server 110 must perform an operation for providing the service to the first device 101 and the third device 103, an overload may occur. Therefore, the second device 102 may selectively transmit the identification information of the first device 101 or the third device 103 to the external server 110 based on the distance information with the first device 101 or the third device 103.

Figure 3:
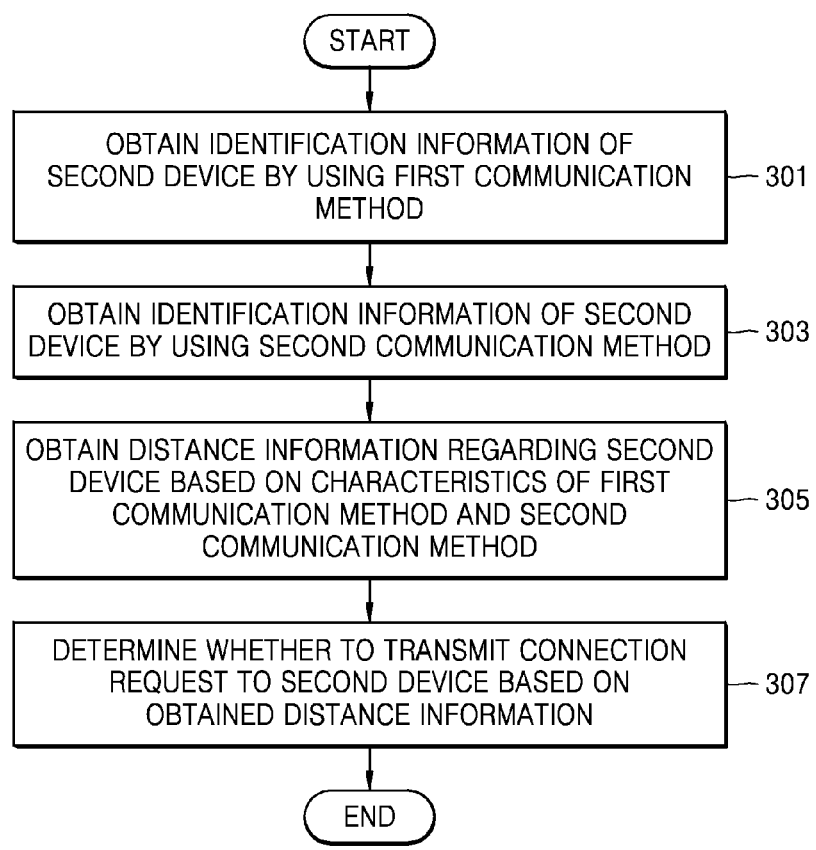
FIG. 3 shows a flowchart for explaining a connection establishment method used by a first device according to some embodiments.

FIG. 3 shows a flowchart for explaining a connection establishment method performed by a first device according to some embodiments.

In step 301, the first device may obtain identification information of a second device by using a first communication method.

According to some embodiments, the first communication method may be a short-range communication method. For example, the first communication method may include Bluetooth, Bluetooth Low Energy (BLE), Zigbee, and the like, and is not limited to the above example.

In step 303, the first device may obtain the identification information of the second device by using a second communication method.

According to some embodiments, the second communication method may be a communication method using ultrasonic waves. According to some embodiments, the first device may perform ultrasonic communication by using a sound input unit and a sound output device such as a speaker and a microphone. The first device may perform ultrasonic communication by using a communication interface other than a sound input/output device.

According to some embodiments, the second communication method may be a communication method using directional sound. Directional sound may include sound having a waveform that proceeds only in a predetermined direction or sound in a predetermined frequency range, and is not limited to the above example.

According to some embodiments, the second device may transmit the identification information of the second device to the first device by using each of the first communication method and the second communication method. The second device may simultaneously transmit the identification information of the second device to the first device by using each of the first communication method and the second communication method.

According to some embodiments, the first device may broadcast or advertisement identification information of the first device. The second device performs a device search to receive identification information broadcasted or advertised from a peripheral device. The second device may obtain the identification information of the first device as a result of performing the device search and transmit the identification information of the second device to the first device by using each of the first communication method and the second communication method according to the obtained identification information of the first device.

Additionally, according to some embodiments, the first device may obtain capability information of the second device from the second device. The capability information is information on the capability of a device and may include a supported communication method, a service type, a version, a model name, a processing speed, a storage capacity, and the like, and is not limited to the above example.

In step 305, the first device may obtain distance information with the second device based on characteristics of the first communication method and the second communication method.

According to some embodiments, the first device obtain the distance information with the second device based on a time at which the identification information of the second device is obtained using the first communication method and a time at which the identification information of the second device is obtained by using the second communication method. This corresponds to that described in FIG. 2.

According to some embodiments, the first device may obtain the distance information with the second device based on position information of the first device and position information of the second device.

According to some embodiments, the first device may obtain distance information from the second device. That is, the second device may obtain distance information with the first device, and may directly provide the distance information to the first device. For example, if the first device broadcasts the identification information of the first device by using each of the first communication method and the second communication method, the second device may obtain the identification information of the first device by using the first communication method and the second communication method and obtain the distance information according to characteristics of the first communication method and the second communication method.

Also, according to some embodiments, the first device may obtain distance information obtained by a device (e.g., an external server or a separate device connected to the second device) other than the second device.

According to some embodiments, the first device may obtain the distance information with the second device without exchanging synchronization information (Sync information) before establishing a connection with the second device.

According to some embodiments, the first device may display the obtained distance information on a screen. For example, the first device may display the identification information of the second device and the distance information with the second device on the screen.

In step 307, the first device may determine whether to transmit a connection request to the second device based on the obtained distance information.

According to some embodiments, the first device may determine whether the second device is located within a predetermined range of distance based on the obtained distance information, and may selectively transmit the connection request to the second device based on a determination result.

For example, the first device may determine whether the second device is located within a 1 m distance, and transmit the connection request when the second device is located within the 1 m distance from the first device, and may not transmit the connection request when the second device is located at a distance of 1 m or more. The first device may transmit the connection request when a distance with the second device is equal to or greater than the predetermined range of distance. The predetermined range of distance may be changed by a setup of the user.

According to some embodiments, the first device may simultaneously transmit the connection request to the second device by using each of the first communication method and the second communication method.

According to some embodiments, if there are a plurality of second devices located within a predetermined range, the first device may select a second device located closest to the first device based on the distance information obtained in step 305, and may receive a user input selecting one of the second devices located within the predetermined range. Additionally, the first device may compare identification information of the plurality of second devices obtained by using the first communication method with identification information of the plurality of second devices obtained by using the second communication method, and additionally, select the second device to which the connection request is to be transmitted by considering the distance information obtained in step 305.

Additionally, the first device may determine whether to transmit the connection request to the second device based on a method of a service that the first device is intended to provide. For example, when the service to be provided by the first device is a service that does not require a direct connection with the second device, the first device may not transmit the connection request even if the second device is located within the predetermined range of distance. According to some embodiments, the first device may transmit the identification information of the second device obtained in steps 301 to 303 to the external server when the second device is located within the predetermined range of distance.

According to some embodiments, the first device may receive a response to the connection request from the second device. The first device may also establish the connection with the second device based on the received response. The response to the connection request may include information necessary for establishing the connection with the second device. For example, the response to the connection request may include capability information of the second device.

According to some embodiments, the first device may transmit the information necessary for establishing the connection to the second device.

According to some embodiments, the first device may transmit first key data to the second device by using each of the first communication method and the second communication method, based on the received response to the connection request. The first device may also receive second key data from the second device by using each of the first communication method and the second communication method to the second device.

According to some embodiments, the first device may determine whether to establish the connection with the second device based on the first key data and the second key data. That is, the first device may establish the connection with the second device only when the first key data and the second key data correspond.

The case where the first key data and the second key data correspond means that the first key data and the second key data are identical or the first device and the second device derive the same value through a predetermined function or a predetermined arithmetic operation. Additionally, the first device and the second device may establish a secured channel by exchanging the first key data and the second key data after the connection establishment. According to some embodiments, the secured channel may refer to a channel in which security is maintained.

Figure 4:
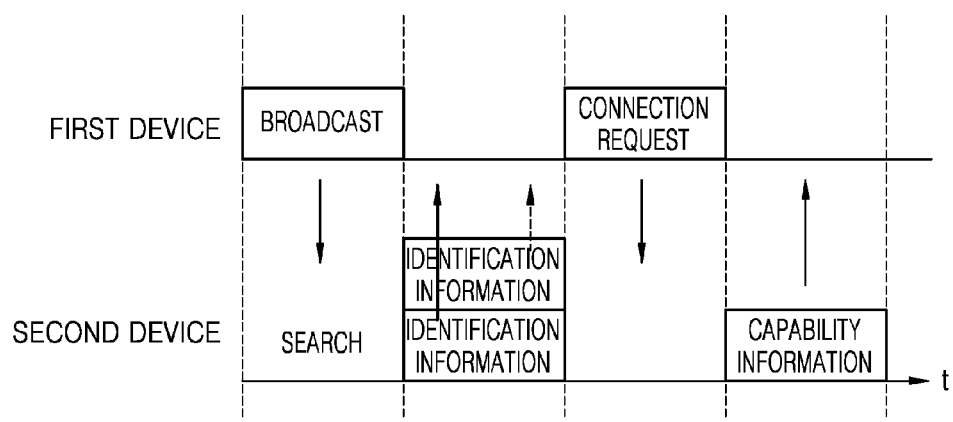
FIG. 4 illustrates a connection establishment method relating to a communication method used by a device according to some embodiments.

FIG. 4 illustrates a connection establishment method relating to a communication method used by a device according to some embodiments.

According to some embodiments, a first device may broadcast or advertise identification information of the first device. According to some embodiments, the first device may provide the identification information of the first device to the second device by broadcasting a beacon frame or a beacon packet, and may provide the identification information of the first device by inquiring the second device. That is, the first device may randomly provide the identification information of the first device to a network of a predetermined range other than a target device, thereby providing the identification information of the first device to other devices to be connected to the first device.

According to some embodiments, the second device scans a device to establish a connection. During a device search, the second device may obtain the identification information of the first device broadcasted by the first device. That is, by performing listening, the second device may obtain the identification information broadcasted or advertised by the first device.

According to some embodiments, the second device may transmit identification information of the second device to the first device. According to some embodiments, the second device may transmit the identification information of the second device to the first device by using each of a first communication method and a second communication method. According to some embodiments, the second device may simultaneously transmit the identification information of the second device to the first device by using each of the first communication method and the second communication method.

According to some embodiments, after transmitting the identification information, the second device may provide capability information of the second device to the first device. The first device may selectively perform connection establishment of the second device by considering at least one of distance information of the second device, the identification information of the second device, and the capability information of the second device, as described with reference to FIG. 3.

Figure 5:
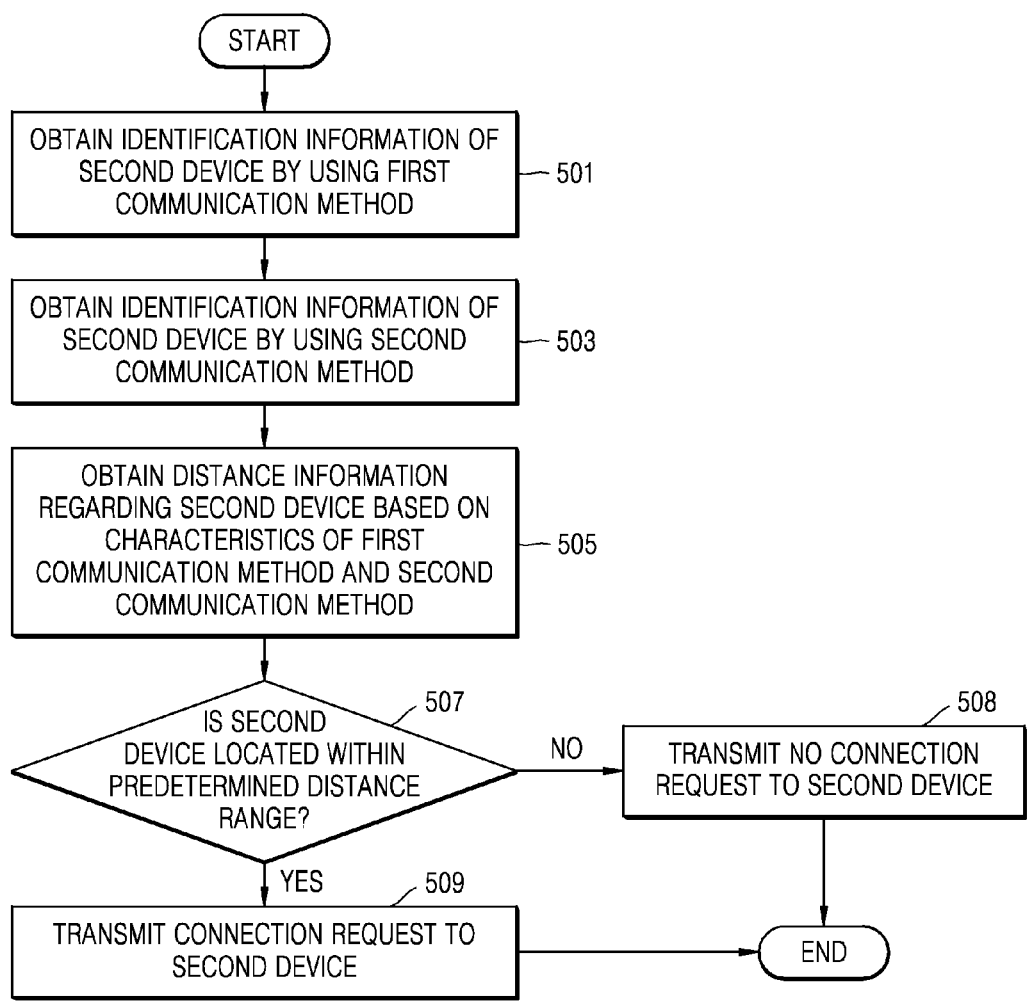
FIG. 5 illustrates a detailed flowchart for explaining a method of establishing a connection between devices according to some embodiments.

FIG. 5 illustrates a detailed flowchart for explaining a method of establishing a connection between devices according to some embodiments.

In step 501, a first device may obtain identification information of a second device by using a first communication method.

In step 503, the first device may obtain the identification information of the second device by using a second communication method.

In step 505, the first device may obtain distance information with the second device based on characteristics of the first communication method and the second communication method. Steps 501 to 503 correspond to those described above.

In step 507, the first device may determine whether the second device is located within a predetermined range of distance. In other words, the first device may determine whether the second device is located within the predetermined range of distance according to the distance information obtained in step 505.

According to some embodiments, the predetermined range of distance may mean equal to or more than the predetermined distance and less than the predetermined distance. For example, the predetermined range of distance may mean a range equal to or more than 50 cm and less than 1 m.

According to some embodiments, the first device may not transmit a connection request to the second device even if the second device is very close to the first device.

In step 508, the first device may not transmit the connection request to the second device if the second device is not located within the predetermined range of distance. The first device may track a position of the second device by receiving the identification information of the second device from the second device by using each of a first communication method and a second communication method during a predetermined period.

In step 509, the first device may transmit the connection request to the second device. That is, if the second device is located within the predetermined range of distances, the first device may transmit the connection request to the second device.

Figure 6:
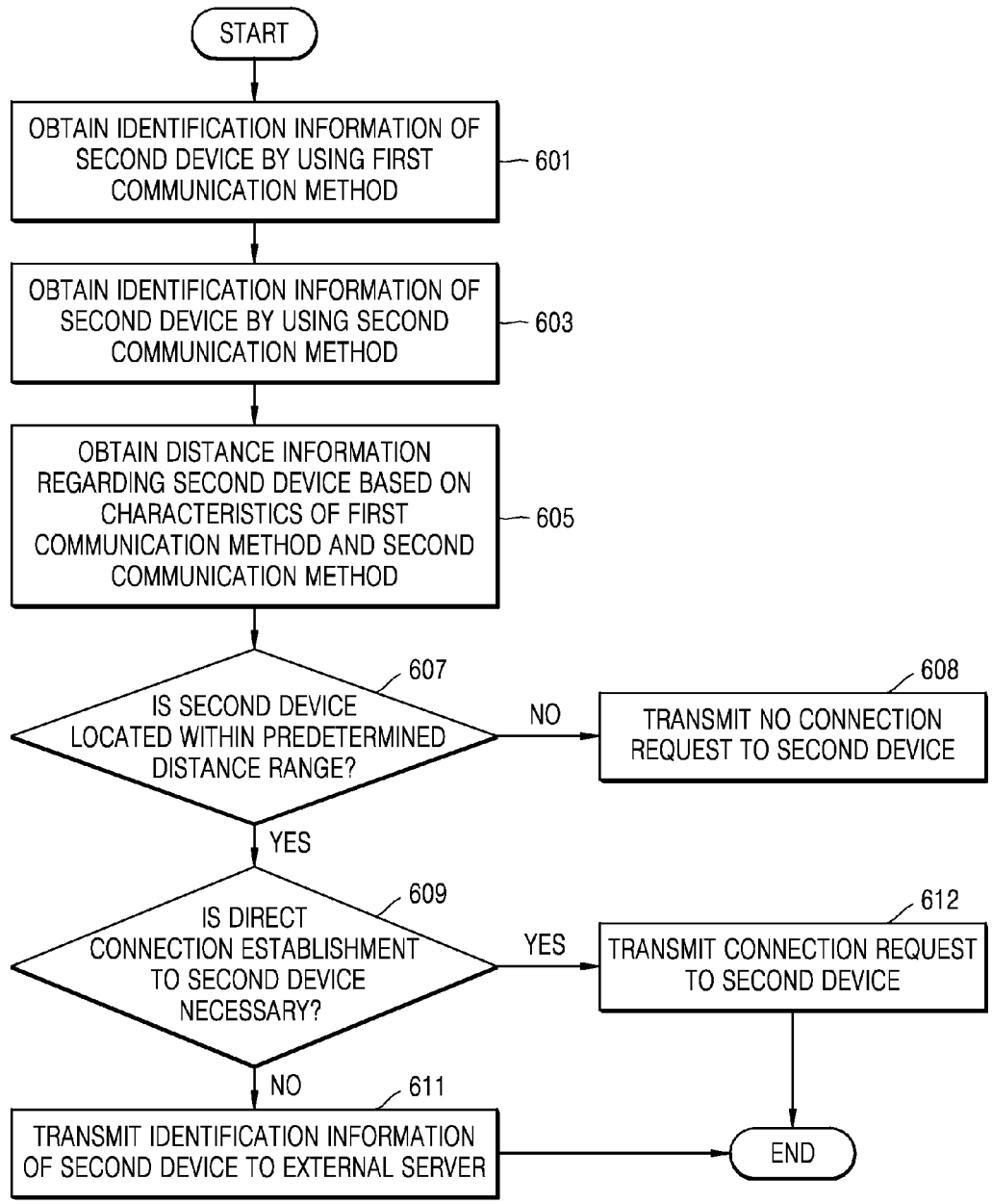
FIG. 6 illustrates a flowchart for explaining a method of providing a service between devices according to some embodiments.

FIG. 6 illustrates a flowchart for explaining a method of providing a service between devices according to some embodiments.

In step 601, a first device may obtain identification information of a second device by using a first communication method.

In step 603, the first device may obtain the identification information of the second device by using a second communication method.

In step 605, the first device may obtain distance information with the second device based on characteristics of the first communication method and the second communication method.

In step 607, the first device may determine whether the second device is located within a predetermined range of distance. Since steps 601 to 607 correspond to those described above, detailed descriptions thereof will be omitted.

In step 608, if the second device is not located within the predetermined range of distance, the first device may not transmit a connection request to the second device. According to some embodiments, the first device may measure and obtain information about time that the second device is located within the predetermined range, and may determine whether to request a connection to the second device based on the obtained time information.

In step 609, the first device may determine whether to establish a direct connection with the second device. According to some embodiments, the first device may determine whether a connection establishment with the second device is necessary based on a service method to provide to be provided to the second device. For example, when providing the service to the second device through another device such as an external server, the first device may not directly establish the connection with the second device.

According to some embodiments, the external server may include a content server, a service server, and a cloud server and is not limited to the above example. Additionally, the external server may be an aggregate of servers rather than a single server.

In step 610, if a direct connection establishment with the second device is required, the first device may transmit the connection request to the second device. According to some embodiments, the first device may transmit the distance information between the first device and the second device to the second device. The first device may also transmit capability information of the first device to the second device.

In step 611, if the direct connection establishment with the first device is not required, the first device may transmit the identification information of the second device to the external server. According to some embodiments, the first device may obtain capability information of the second device from the second device, and may transmit the capability information of the second device to the external server. Also, the first device may transmit the distance information between the first device and the second device to the external server.

According to some embodiments, the external server may provide the service to the second device based on the identification information of the second device obtained from the first device. For example, in the specification, the service may include a service related to a transaction, an advertisement, and content, and the external server may provide transaction information, advertisement information, and contents to the second device. The present disclosure is not limited to the above example. The external server may provide all kinds of services to the second device. That is, the external server may provide the service only to the second device existing within a predetermined range of distance from the first device.

Figure 7:
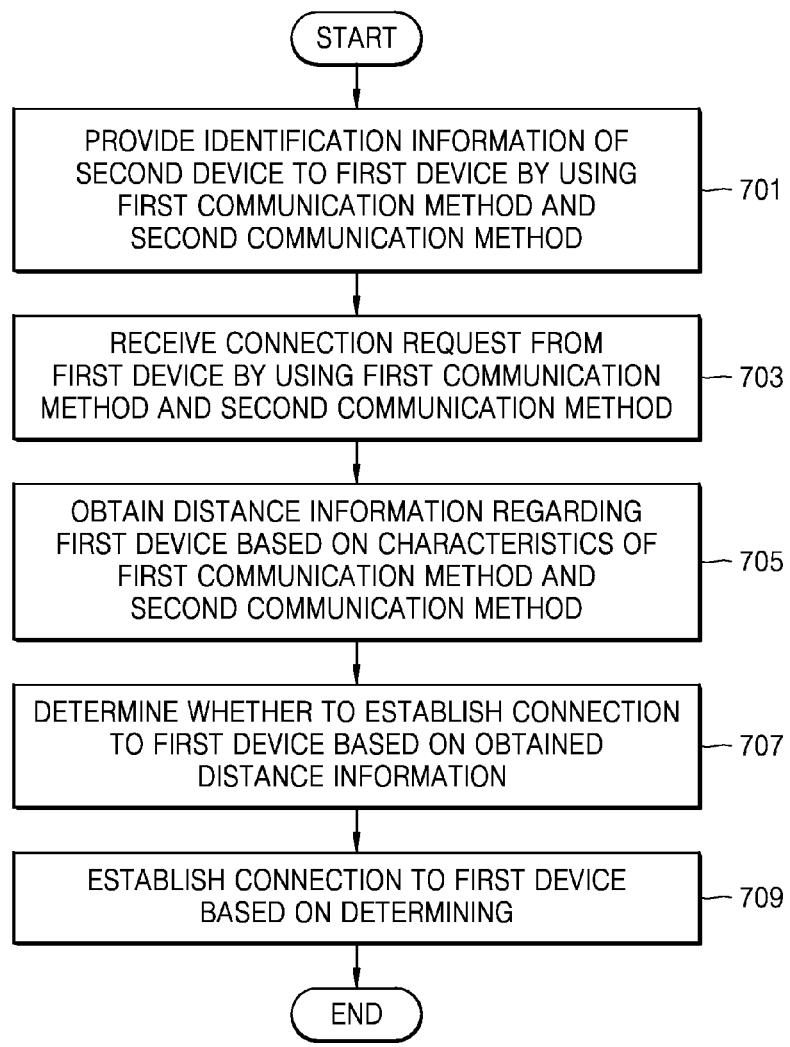
FIG. 7 illustrates a flowchart for explaining a connection establishment method used by a second device according to some embodiments.

FIG. 7 illustrates a flowchart for explaining a connection establishment method performed by a second device according to some embodiments.

In step 701, the second device may provide the first device with identification information of the second device by using a first communication method and a second communication method. According to some embodiments, the second device may search for the first device for establishing a connection, and may provide the identification information of the second device to the first device by using the first communication method and the second communication method. According to some embodiments, the second device may receive identification information of the first device from the first device and provide the identification information of the second device to the first device by using the first communication method and the second communication method based on the received identification information of the first device.

In step 703, the second device may receive a connection request from the first device by using the first communication method and the second communication method.

According to some embodiments, the first device may simultaneously transmit the connection request to the second device by using the first communication method and the second communication method. According to some embodiments, the connection request may be a connection establishment request.

In step 705, the second device may obtain distance information with the first device based on characteristics of the first communication method and the second communication method. A method of obtaining the distance information in step 705 may correspond to a method in which the first device obtains distance information with the second device described in step 305 of FIG. 3.

In step 707, the second device may determine whether to establish the connection with the first device based on the obtained distance information. According to some embodiments, the second device may determine whether to respond to the connection request received from the first device based on the obtained distance information. Also, according to some embodiments, the second device may determine whether to accept or approve the connection request received from the first device based on the obtained distance information.

According to some embodiments, the second device may receive the distance information obtained by the first device from the first device, and compare the distance information obtained from the first device with the distance information directly obtained by the second device, thereby determining whether to establish the connection with the first device.

In step 709, the second device may establish the connection with the first device based on determining. For example, the second device may establish the connection with the first device when the first device is located within a predetermined range of distance, based on the obtained distance information.

According to some embodiments, the second device may receive first key data from the first device by using each of the first communication method and the second communication method. The second device may compare the distance information obtained in step 705 with the distance information obtained by receiving the first key data by using the first communication method and the second communication method and determine whether to establish the connection with the first device based on a result of comparing.

Also, according to some embodiments, the second device may transmit second key data to the first device. The first device and the second device may establish a communication channel in which security is maintained by using the first key data and the second key data. The first device and the second device may separately establish the communication channel in which security is maintained by exchanging the first key data and the second key data after connection establishment.

Figure 8:
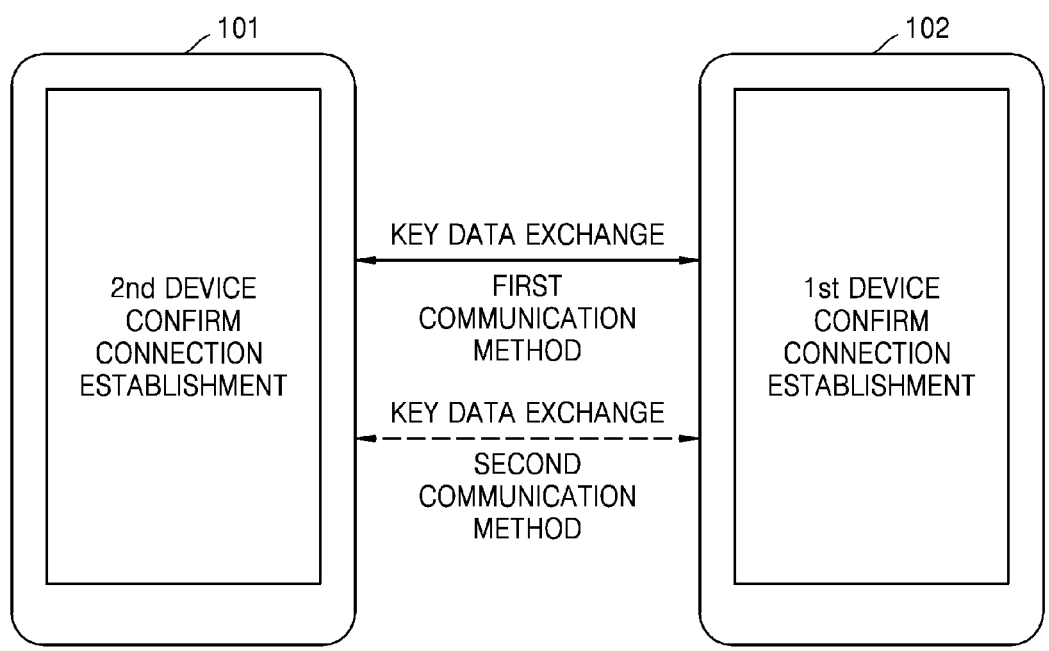
FIG. 8 illustrates a system in which a first device and a second device exchange key data according to some embodiments.

FIG. 8 illustrates a system in which a first device and a second device exchange key data according to some embodiments.

Referring to FIG. 8, the first device may exchange the key data with the second device by using a first communication method and a second communication method. According to some embodiments, the first device may simultaneously provide the key data to the second device by using the first communication method and the second communication method. The second device may also simultaneously provide the key data to the first device by using the first communication method and the second communication method.

According to some embodiments, the first device and the second device may obtain distance information between the first device and the second device by exchanging the key data by using the first communication method and the second communication method. This corresponds to that described above.

A key data exchange procedure shown in FIG. 8 may be performed before or after a connection establishment. The first device and the second device may establish a connection in which security is maintained by using the exchanged key data. According to some embodiments, establishment of the connection in which security is maintained may mean including establishment of a communication channel in which security is maintained or formation of a link in which security is maintained.

Also, according to some embodiments, the first device and the second device may exchange the key data and then determine whether to establish the connection based on the key data. According to some embodiments, the first device and the second device may determine whether to establish the connection based on the key data and the obtained distance information. Additionally, the first device and the second device may establish the connection without separately receiving s user input if the key data corresponds. That is, by a user confirms a screen of a device, the first device and the second device may establish the connection between the first device and the second device by additionally considering the distance information between the first device and the second device without receiving an input of the user to confirm a result of calculation based on the key data.

Figure 9:
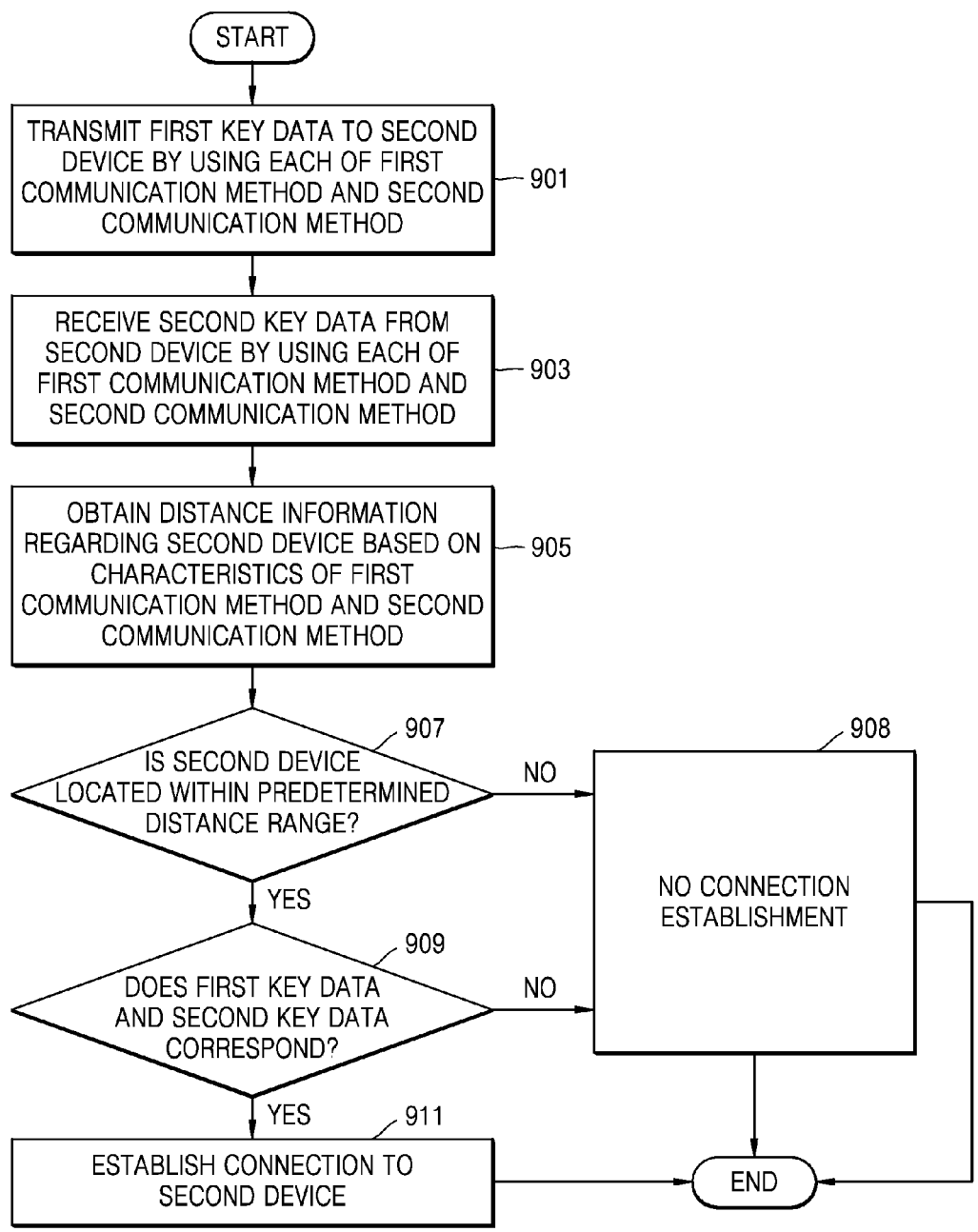
FIG. 9 illustrates a flowchart for explaining a key data exchange and a connection establishment between devices according to some embodiments.

FIG. 9 illustrates a flowchart for explaining a key data exchange and a connection establishment between devices according to some embodiments.

According to some embodiments, a procedure described in the flowchart of FIG. 9 may be performed before or after the connection establishment.

In step 901, a first device may transmit first key data to a second device by using each of a first communication method and a second communication method. According to some embodiments, the first device may simultaneously transmit the first key data to the second device by using each of the first communication method and the second communication method.

In step 903, the first device may receive second key data from the second device by using each of the first communication method and the second communication method.

In step 905, the first device may obtain distance information with the second device based on characteristics of the first communication method and the second communication method. A method of obtaining the distance information corresponds to the method described above, and thus a detailed description thereof will be omitted.

In step 907, the first device may determine whether the second device is located within a predetermined range of distance.

According to some embodiments, the first device may determine whether the second device is located within the predetermined range of distance based on the distance information obtained in step 305 of FIG. 3.

Also, according to some embodiments, the first device may obtain distance difference information with the second device by comparing the distance information obtained in step 305 of FIG. 3 with the distance information obtained in step 905. That is, the first device may determine whether the second device moves or changes during a connection establishment procedure based on the distance difference information.

The first device may determine whether to establish a connection with the second device or whether to transmit identification information of the second device to an external server based on the distance difference information.

In step 908, if the second device is not located within the predetermined range of distance, the first device may not establish the connection with the second device. According to some embodiments, the first device may provide the identification information of the second device to another device such as a server such that the other device may provide a service to the second device, even if the second device is not located within the predetermined range of distance.

In step 909, the first device may determine whether the first key data and the second key data correspond. The first device may process the first key data and the second key data with a predetermined function or perform a predetermined arithmetic operation using the first key data and the second key data as parameters, thereby determining whether the second key data is data received from the second device which is performing the connection establishment procedure. The first device may determine whether the first key data and the second key data correspond by comparing the first key data with the second key data.

In step 911, the first device may establish the connection with the second device.

According to some embodiments, the first device may establish the connection with the second device, without receiving a user input, based on results of steps 907 through 909. The first device may also establish a connection in which security is maintained by using the first key data and the second key data.

Figure 10:
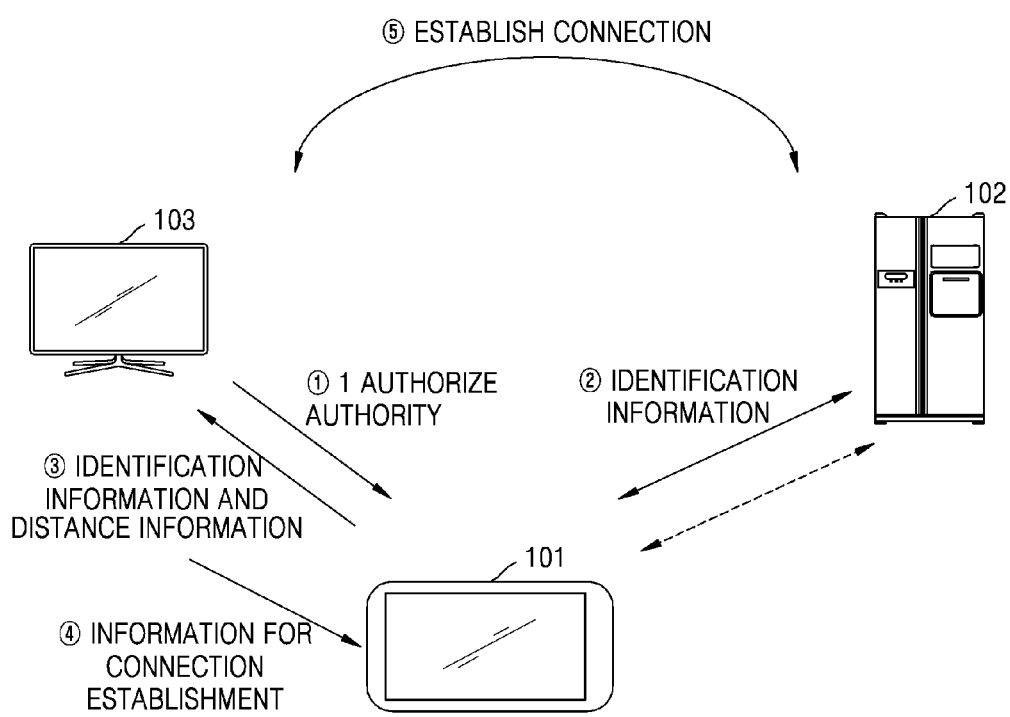
FIG. 10 illustrates a system for explaining a connection establishment method relating to authority authorization according to some embodiments.

FIG. 10 illustrates a system for explaining a connection establishment method relating to authority authorization according to some embodiments.

Consumer electronics (CE) devices may generally have poor portability and may be identified by identification information that is difficult for a user to identify. Also, CE devices are somewhat inconvenient to use interface to receive a user input compared to mobile devices such as smart phones and tablets. Therefore, a lot of effort is required by the user to perform connections between CE devices. According to some embodiments, CE devices may include a refrigerator, a washing machine, an audio, a vacuum cleaner, an oven, and the like, and are not limited to the above example.

Thus, in order to establish a connection that is fast and simple and in which security is maintained, CE devices may authorize a predetermined device that has a convenient user interface and an easy mobility to establish a connection on behalf of the CE devices.

Referring to FIG. 10, the third device 103 may authorize the first device 101 to establish a connection. The authorized first device 101 may perform a connection establishment procedure with the second device 102 through a first communication method and a second communication method. The connection establishment procedure performed by the first device 101 and the second device 102 in FIG. 10 may correspond to descriptions provided with reference to FIG. 3 to FIG. The first device 101 may transmit identification information and distance information of the second device 102 obtained through the connection establishment procedure to the third device 103. Additionally, the third device 103 may provide the first device 101 with information for the connection establishment. Since the third device 103 obtains the identification information and the distance information of the second device 102 through the first device 101, the third device 103 may establish a connection with the second device 102.

Figure 11:
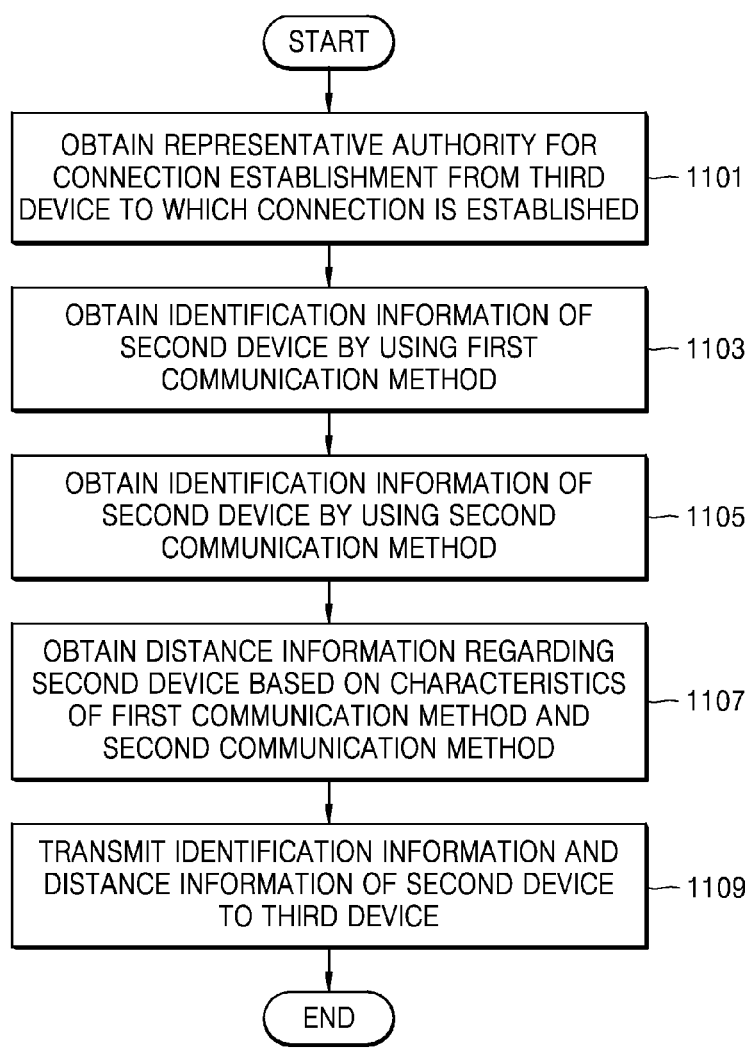
FIGS. 11 and 12 illustrate flowcharts for explaining a method of establishing a connection between devices relating to authority authorization according to some embodiments.
Figure 12:
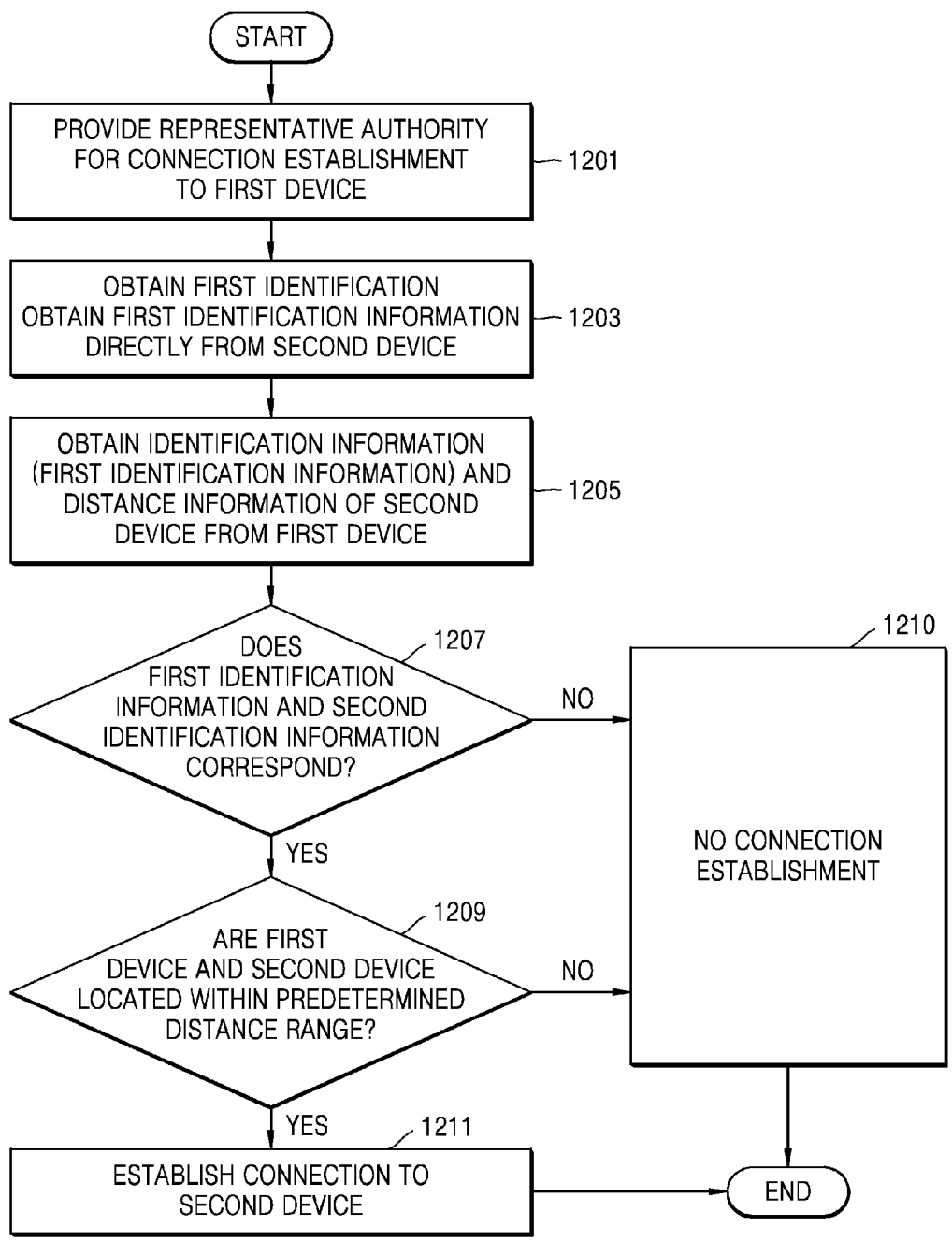

FIGS. 11 and 12 illustrate flowcharts for explaining a method of establishing a connection between devices relating to authority authorization according to some embodiments.

In step 1101, a first device may obtain a representative authority for connection establishment on behalf of a third device, from the third device to which a connection is established. According to some embodiments, the first device may establish a connection to the third device and may be authorized for a connection establishment by the third device through the established connection. The connection established between the first device and the third device may include a communication channel with constant security.

According to some embodiments, the representative authority for connection establishment may include information about a device to which the third device is to establish the connection. That is, the first device may determine whether to establish the connection between the third device and a second device. The third device may receive identification information of the second device from the first device and determine whether to establish the connection.

According to some embodiments, if the first device obtains the representative authority for connection establishment from the third device, the first device may display information of the obtained authority on a screen. In other words, the first device may display information on the screen so as to determine if a connection establishment procedure between the first device and the second device is performed or if the connection establishment procedure with the second device is performed on behalf of the third device.

For example, the first device may display an alert or may display an interface for receiving a user input when obtaining the representative authority for connection establishment. The first device may also display an alert that the connection establishment procedure to the second device is being performed on a part of the screen on behalf of the third device when performing the connection establishment procedure.

According to some embodiments, the first device may determine whether a connection between the third device and the second device is required based on the obtained authority.

According to some embodiments, the first device may store the obtained representative authority for connection establishment. The first device may also request the third device to authorize the representative authority for connection establishment.

In step 1103, the first device may obtain the identification information of the second device by using a first communication method.

In step 1105, the first device may obtain the identification information of the second device by using a second communication method.

In step 1107, the first device may obtain distance information with the second device based on characteristics of the first communication method and the second communication method. Since steps 1103 to 1107 correspond to those described in FIG. 3, detailed descriptions thereof are omitted.

In step 1109, the first device may transmit the identification information of the second device to the third device. Additionally, the first device may transmit capability information of the second device to the third device.

According to some embodiments, the first device may receive information necessary for establishing the connection between the second device and the third device from the third device. The first device may transmit to the second device the information necessary for establishing the connection received from the third device.

According to some embodiments, the first device may obtain third key data from the third device, and may transmit the key data obtained from the third device to the second device.

The first device may receive fourth key data from the second device, and may transmit the fourth key data obtained from the second device to the third device. According to some embodiments, the first device may exchange the third key data and the fourth key data with the second data by using the first communication method and the second communication method. This corresponds to that described above.

According to some embodiments, the first device may determine whether to establish the connection between the second device and the third device based on the third key data and the fourth key data. The first device may determine whether to establish the connection between the second device and the third device based on the distance information obtained in step 1107, the third key data, and the fourth key data.

According to some embodiments, the first device may transmit the fourth key data to the third device, and the third device may determine whether to establish a connection based on the third key data and the fourth key data. According to some embodiments, the third device may determine whether to establish the connection with the second device based on the distance information with the second device, the third key data, and the fourth key data obtained from the first device.

Referring to FIG. 12, in step 1201, the third device may provide the representative authority for connection establishment to the first device. This is the same as that described in step 1101 of FIG. 11, and thus a detailed description thereof will be omitted.

In step 1203, the third device may directly obtain first identification information from the second device. According to some embodiments, the third device may not perform step 1203 according to an implementation. For example, when the third device is located in a place where the third device may not directly obtain the first identification information from the second device, the third device may proceed to step 1205 without performing step 1203.

In step 1205, the third device may obtain the identification information and the distance information regarding the second device from the first device. The first device authorized by the third device may obtain the identification information and the distance information from the second device and transmit the obtained identification information and distance information to the third device as described in FIG. 11. For convenience of explanation, the identification information of the second device obtained by the third device from the first device is referred to as second identification information.

In step 1207, the third device may determine whether the first identification information and the second identification information correspond. According to some embodiments, the third device may select a device corresponding to the second identification information transmitted by the first device when the first identification information which is the identification information directly obtained by the third device is plural.

For example, the third device may compare the second identification information received from the first device with the first identification information obtained directly by the third device, thereby establishing the connection with the second device located closest to the first device. That is, if a user places the first device authorized for the representative authority for connection establishment from the third device close to the second device to be connected with the third device, the third device and the second device may perform the connection establishment procedure through the first device.

In step 1209, the third device may determine whether the first device and the second device are located within a predetermined range of distance. According to some embodiments, the third device may determine whether the first device and the second device are located within the predetermined range of distance based on the distance obtained in step 1205.

According to some embodiments, as described with reference to FIG. 11, the first device may determine whether the second device is located within the predetermined range of distance and may transmit a result of determining to the third device.

In step 1210, according to results of determining of step 1207 and step 1209, if it is determined that the second device is not located within the predetermined range of distance from the first device or the first identification information does not correspond to the second identification information, the third device may not establish the connection with the second device.

In step 1211, the third device may selectively establish the connection with the second device according to the result of determining of step 1209.

Figure 13:
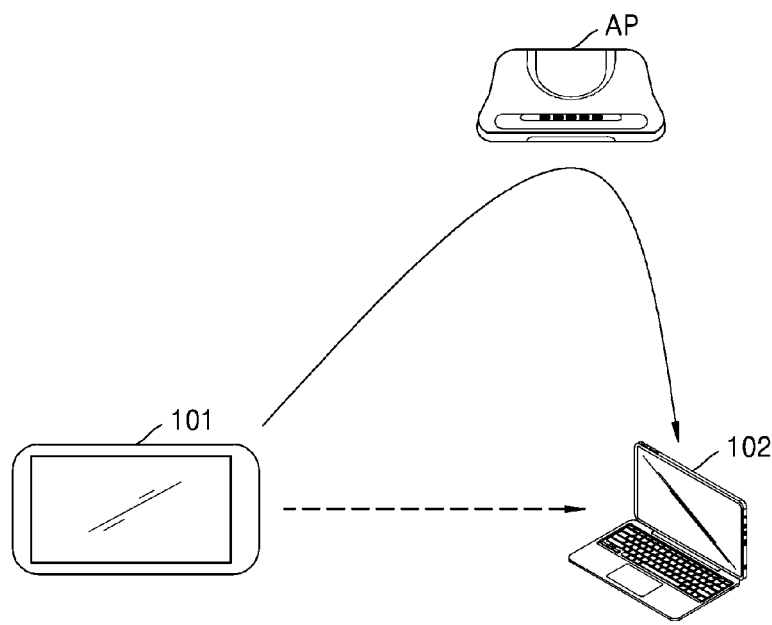
FIG. 13 illustrates a system for explaining a connection establishment through an access point and a connection establishment method through short-distance communication according to some embodiments.

FIG. 13 illustrates a system for explaining a connection establishment through an access point 111 and a connection establishment method through short-distance communication according to some embodiments.

Referring to FIG. 13, the first device 101 may establish a connection with the second device 102 through the access point 111, or may establish a direct connection with the second device 102. According to some embodiments, the connection establishment method may differ depending on a type of service between the first device 101 and the second device 102 and a type and amount of data to be transmitted and received therebetween.

However, if the first device 101 establishes the connection with the second device 102 through the access point 111, a risk of exposure to man-in-the-middle attack (MITM) through the access point 111 may be higher. Accordingly, distance information may be confirmed and a connection establishment procedure may be performed, thereby maintaining security.

FIGS. 14 to 17 are diagrams for explaining a device connection method and a service providing method based on a distance according to some embodiments.

Figure 14:
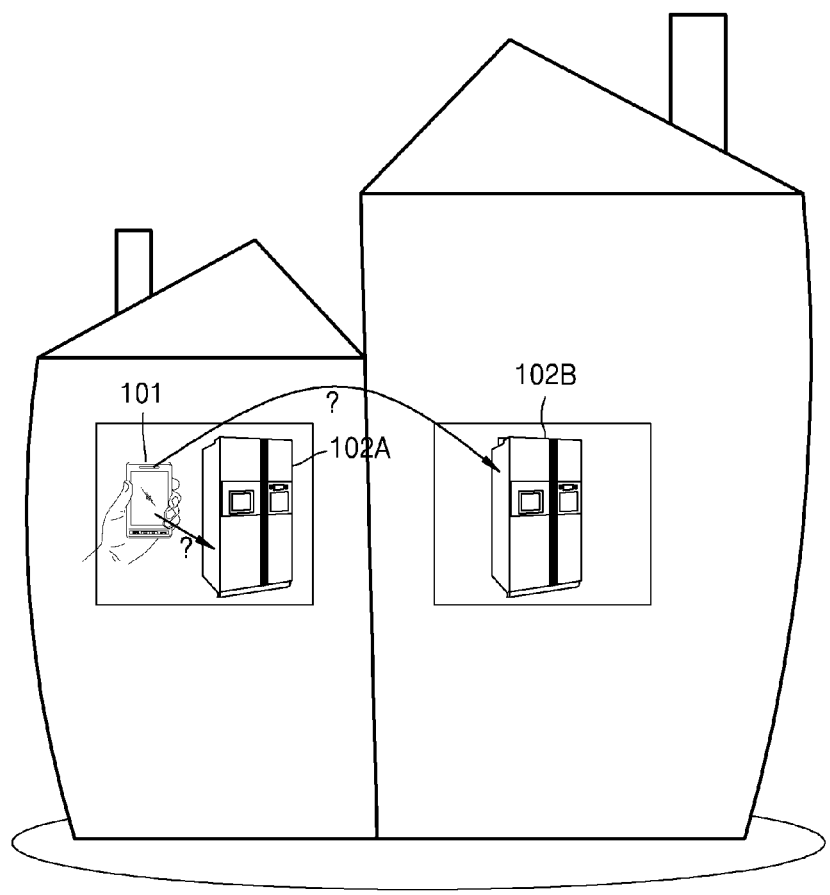
FIGS. 14 to 17 are diagrams for explaining a device connection method and a service providing method based on a distance according to some embodiments.

FIG. 14 shows a case where devices having the same identification information are present in a dense region in a predetermined space. For example, a plurality of second devices 102*a* to 102*b* may have the same identification information (e.g., when a type of a device and model information of the device are the same, etc.)

The first device 101 may establish a connection establishment with one of the plurality of second devices 102*a* to 102*b*. However, since the identification information of the plurality of second devices 102*a* to 102*b* are the same, the first device 101 displays the same information when displaying information about the plurality of second devices 102*a* to 102*b*. Therefore, a user is confused with which device is a device to be connected.

However, according to some embodiments of the present disclosure, the first device 101 may receive identification information from a device to be connected through a first communication channel and a second communication channel, thereby obtaining distance information with the plurality of second devices 102*a* to 102*b*. The first device 101 may display the obtained distance information together with the identification information of the device such that the user may accurately select the device to be connected or may automatically establish a connection with the closest device.

Figure 15:
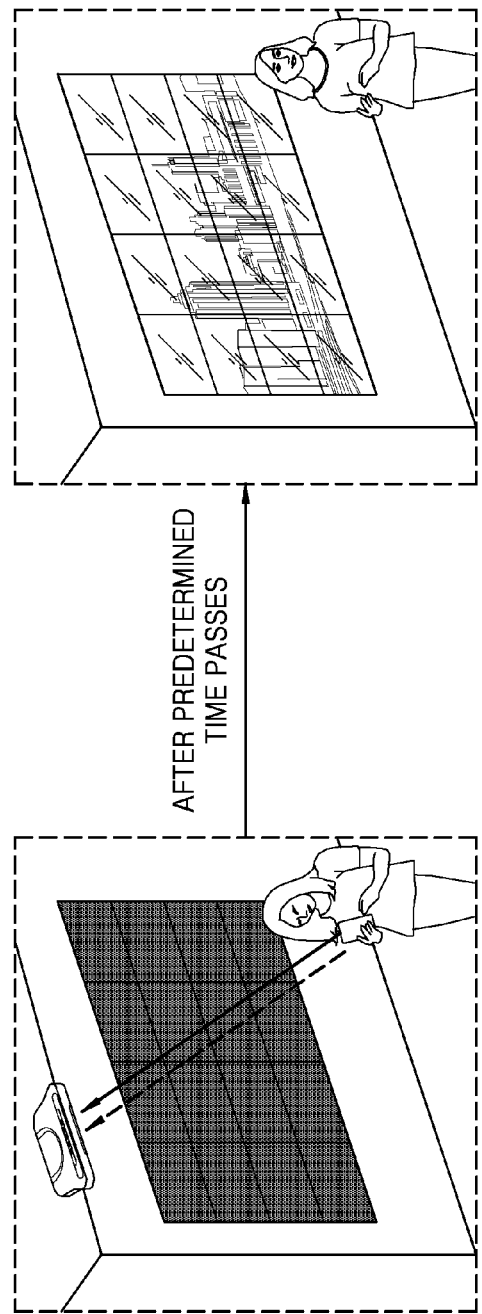

FIG. 15 shows a method of providing a service only when a device stays within a predetermined range for a predetermined period. For example, by operating a display screen for an advertisement only when the second device 102 such as a user terminal stays around the first device 101 for the predetermined period, unnecessary energy may be saved, and the service may be provided to a necessary user.

According to some embodiments, the first device 101, such as a receiver or an access point, may receive identification information from the second device 102 which is a user terminal. The second device 102 may provide the identification information to the first device 101 in the form of a beacon. Also, the second device 102 may simultaneously transmit the identification information of the second device 102 by using a first communication method and a second communication method.

According to some embodiments, the first device 101 may obtain distance information with the second device 102 based on characteristics of the first communication method and the second communication method. The first device 101 may receive the identification information from the second device 102 periodically or aperiodically through the first communication method and the second communication method for the predetermined period.

According to some embodiments, the first device 101 may obtain the distance information of the second device 102 for the predetermined period, thereby determining whether the second device 102 is located within the predetermined range for the predetermined period. The first device 101 may selectively provide the second device 102 with the service based on a result of determining.

Figure 16:
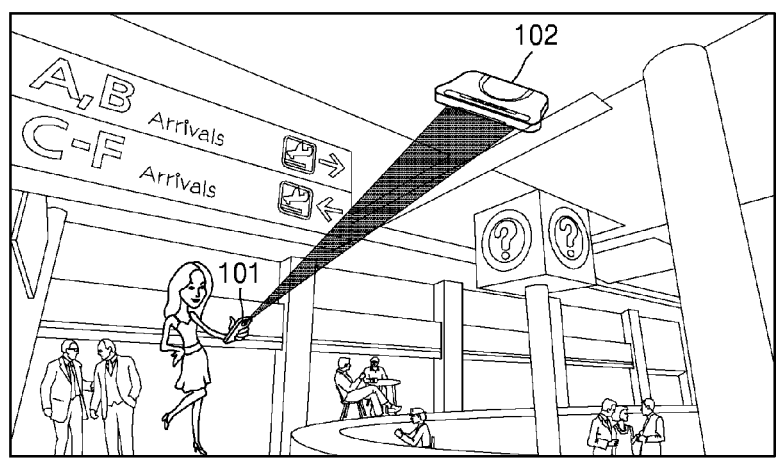

FIG. 16 shows a method of selecting and communicating only a device located within a predetermined range by selecting a communicable range using directional sound.

For example, the first device 101 may selectively communicate with only the second device 102 located within the predetermined range by using sound beamforming or focusing sound technology, and thus a service may be selectively provided to the first device 101. Sound beamforming or focusing sound technology is a technology of generating a focused sound beam, which may include a technology of generating directional sound beam by adjusting a sound output arrangement.

According to some embodiments, the first device 101 may broadcast identification information of the first device 101 via the beacon type. A plurality of second devices 102 may exist and may be fixedly attached at predetermined positions. The first device 101 may broadcast the identification information to only one second device 102 fixed at the predetermined position using directional sound.

According to some embodiments, other devices that have not received the identification information of the first device 101 broadcasted using the directional sound may not establish a connection with the first device 101, or may not transmit the identification information of the first device 101 to an external server, and thus a service may not be provided to the first device 101. That is, the first device 101 may select a predetermined service by moving to a predetermined point (a specific point), and thus the service may be provided to the first device 101.

Figure 17:
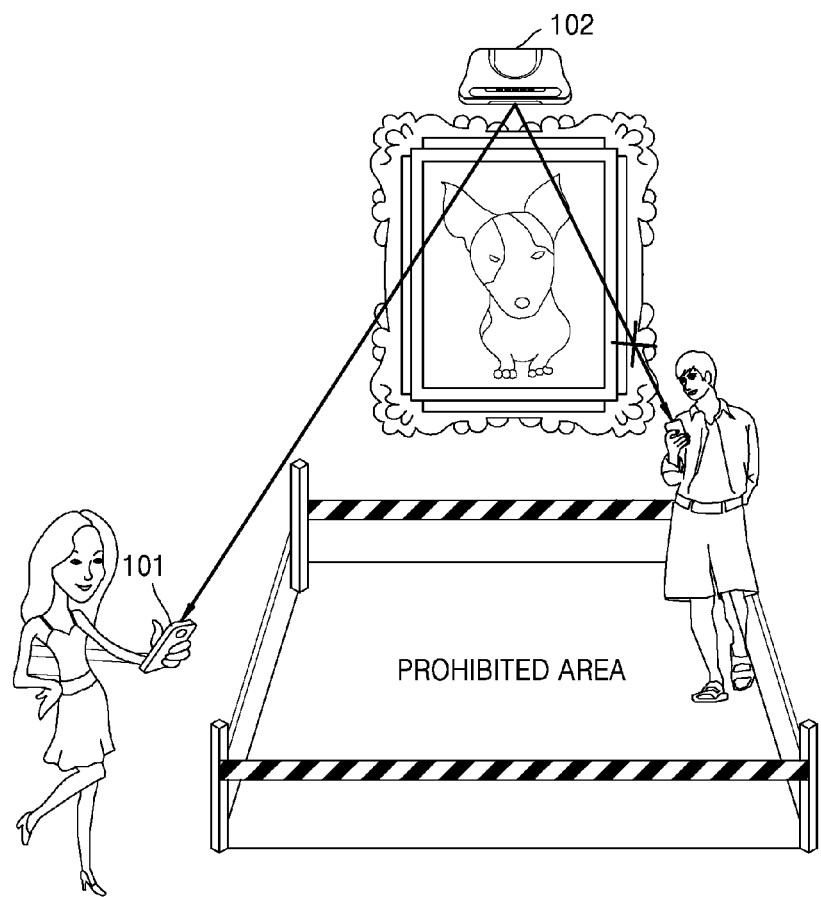

FIG. 17 illustrates a method of providing a service only to a device located in a predetermined range by selecting whether to provide a service according to a distance of the device.

For example, the second device 102 may obtain identification information from the first device 101 by using each of a first communication method and a second communication method, and also obtain identification information from the third device 103 by using each of the first communication method and the second communication method. The second device 102 may obtain distance information between the second device 102 and the first device 101 and distance information between the second device 102 and the third device 103 by using characteristics of the first communication method and the second communication method.

Referring to FIG. 17, the third device 103 is not located within a predetermined range of distance defined by the second device 102. For example, the second device 102 may be configured to provide the service only to devices located at a distance equal to or more than 1 m and equal to or less than 5 m such that device users are not located too close to exhibits in a museum. Therefore, the service may be provided to the first device 101 from the second device 102 because the first device 101 is located at the distance equal to or more than 1 m and equal to or less than 5 m from the second device 102, and the service may not be provided to the third device 103 from the second device 102 because the third device 103 is located at a distance of 1 m from the first device 102.

According to some embodiments, the second device 102 may transmit a predetermined message to a device that is not located within the predetermined range of distance. For example, the second device 102 may transmit a message indicating that the device should move a predetermined distance, or a guide message (e.g., prohibited content, recommendation content, etc.) about a section in which the device is located if the device desires to receive the service.

Figure 18:
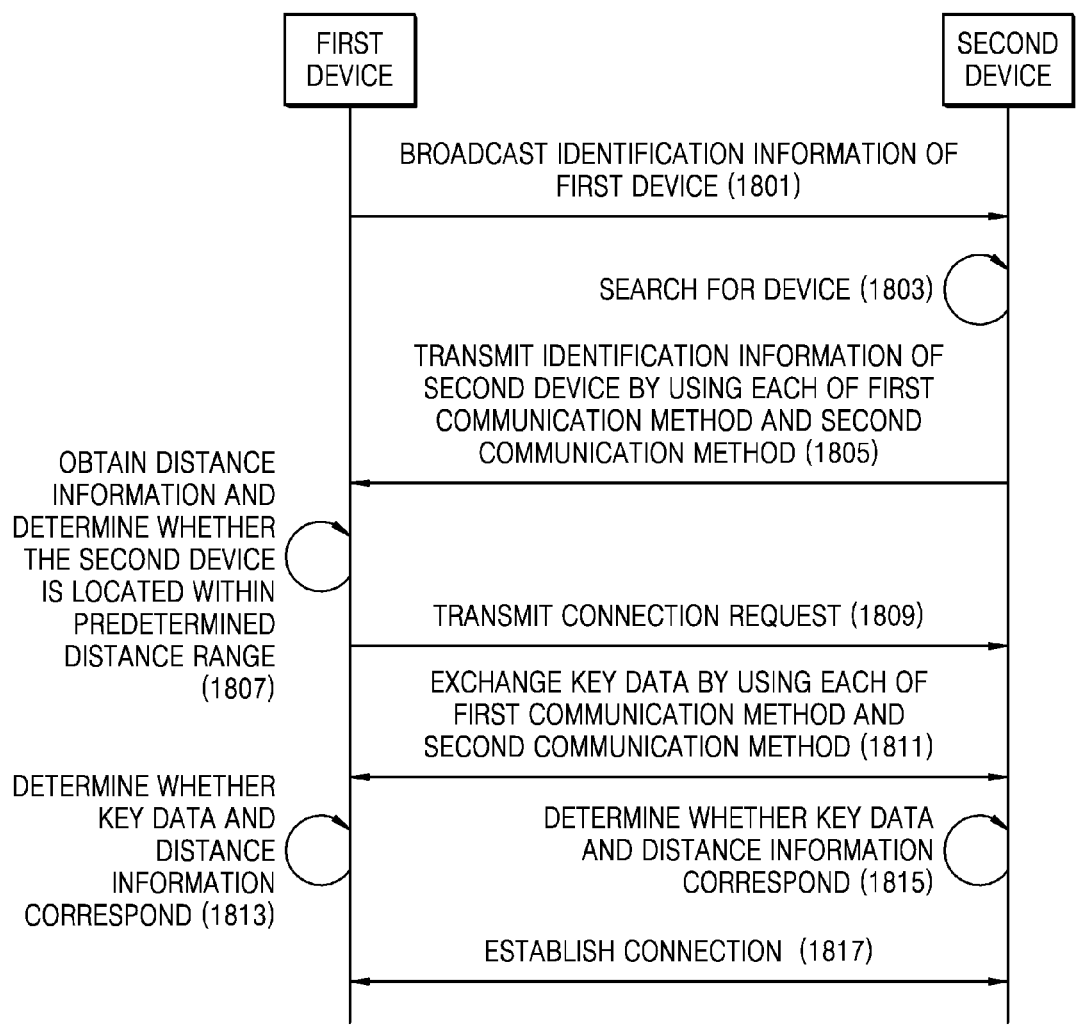
FIGS. 18 to 20 illustrate flowcharts for a connection establishment between devices according to some embodiments.
Figure 19:
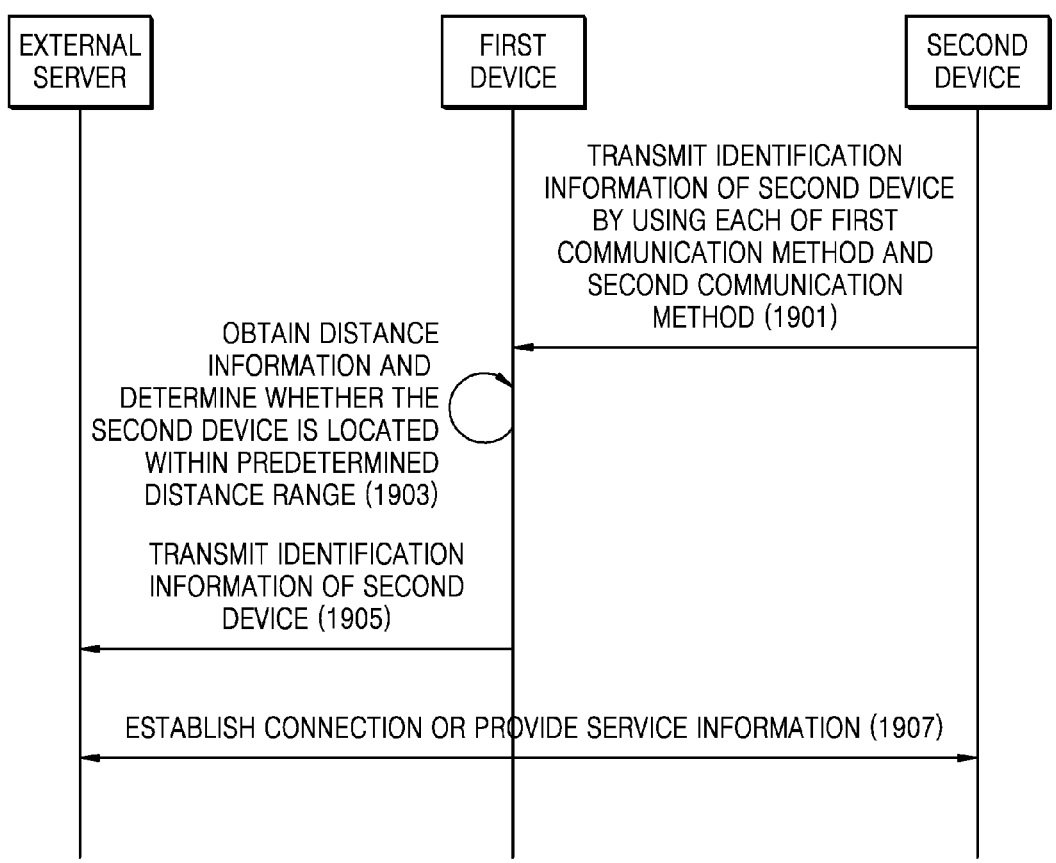
Figure 20:
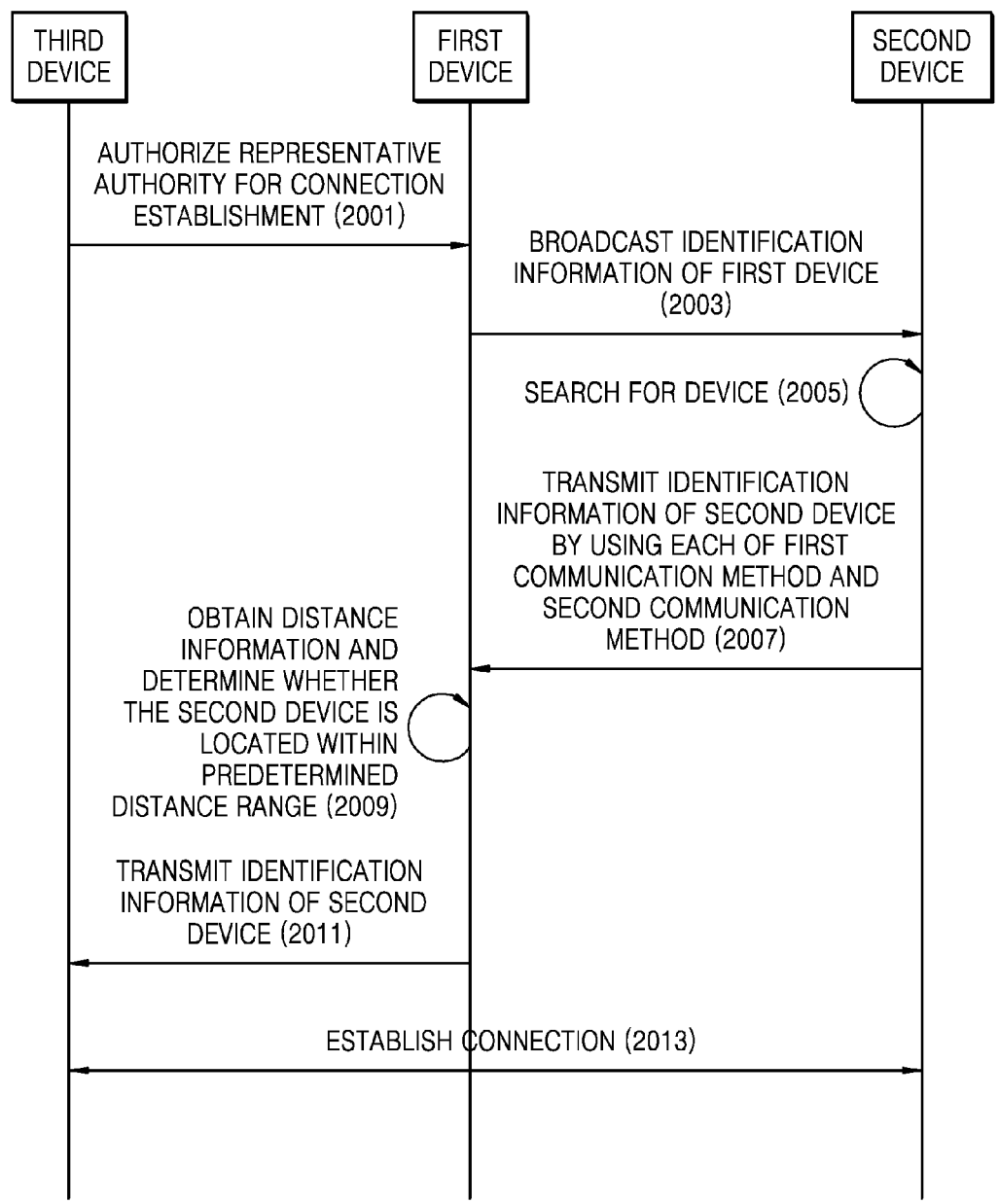

FIGS. 18 to 20 illustrate flowcharts for a connection establishment between devices according to some embodiments.

FIG. 18 is a diagram illustrating a connection establishing procedure between a first device and a second device based on distance information.

In step 1801, the first device may broadcast or advertise identification information of the first device.

In step 1803, the second device may scan a device for the connection establishment. According to a device search result, the second device may obtain the broadcasted identification information of the first device.

In step 1805, the second device may transmit identification information of the second device to the first device by using each of a first communication method and a second communication method.

According to some embodiments, the second device may simultaneously transmit the identification information of the second device to the first device by using each of the first communication method and the second communication method.

According to some embodiments, the second device may broadcast or advertise the identification information of the second device by using at least one of the first communication method and the second communication method without transmitting the identification information of the first device. That is, steps 1801 to 1803 may be omitted according to an implementation.

In step 1807, the first device may obtain first distance information with the second device based on characteristics of the first communication method and the second communication method, and determine whether the second device is within a predetermined range based on the obtained distance information. This is the same as described above, and thus a detailed description thereof will be omitted.

In step 1809, the first device may selectively transmit a connection request to the second device. For example, if the second device is not located within the predetermined range, or the connection establishment with the second device is not required, the first device may not transmit the connection request to the second device.

According to some embodiments, the first device may transmit the identification information of the second device to an external server. Also, the first device may transmit the distance information with the second device to the external server. Even when the first device transmits the connection request to the second device, the first device may transmit the identification information of the second device to the external server, or even when the first device does not transmit the connection request to the second device, the first device may transmit the identification information of the second device to the external server. That is, transmitting the connection request to the second device and transmitting the identification information of the second device to the external server may be independent.

In step 1811, the first device may exchange key data with the second device by using each of the first communication method and the second communication method. The first device may exchange the key data after the connection establishment with the second device. This is the same as that described above, and thus a detailed description thereof will be omitted.

In step 1813, the first device may confirm whether the key data and the distance information correspond.

According to some embodiments, the first device may obtain second distance information with the second device by exchanging the key data by using the first communication method and the second communication method. The first device may compare the first distance information and the second distance information obtained in step 1807 and may confirm whether the second device that has exchanged the key data is the second device to which the connection request was transmitted based on the key data exchanged in step 1811.

According to some embodiments, the first device may compare the key data transmitted to the second device and the key data received from the second device, may process the key data with a predetermined function, or may perform a predetermine arithmetic operation having the key data transmitted to the second device and the key data received from the second device as parameters, thereby confirming whether the second device that has exchanged the key data is the second device.

According to some embodiments, the first device may establish a communication channel in which security is maintained by using the key data transmitted to the second device and the key data received from the second device. That is, the first device may establish a connection in which security is maintained by using the key data transmitted to the second device and the key data received from the second device.

In step 1815, the second device may confirm whether the key data and the distance information correspond.

According to some embodiments, the second device may also obtain the distance information with the first device based on the characteristics of the first communication method and the second communication method and transmit a response to the connection request based on the obtained distance information and the exchanged key data or determine whether to accept the connection request.

According to some embodiments, the second device may compare the key data transmitted to the first device and the key data received from the first device, may process the key data with a predetermined function, or may perform a predetermine arithmetic operation having the key data transmitted to the first device and the key data received from the first device as parameters, thereby confirming whether the first device that has exchanged the key data is the first device.

According to some embodiments, the second device may establish a communication channel in which security is maintained by using the key data transmitted to the first device and the key data received from the first device. That is, the second device may establish a connection in which security is maintained by using the key data transmitted to the first device and the key data received from the first device.

In step 1817, the first device may establish the connection with the second device. In other words, the first device may selectively establish the connection of the second device based on results of confirming in step 1813 and step 1815.

FIG. 19 is a diagram illustrating a procedure for transmitting identification information of a second device to an external server to provide a service to a first device and the second device based on distance information.

In step 1901, the second device may transmit the identification information of the second device by using each of a first communication method and a second communication method.

According to some embodiments, the second device may transmit the identification information of the second device based on identification information of the first device broadcast from the first device.

According to some embodiments, the second device may simultaneously transmit the identification information of the second device by using each of the first communication method and the second communication method.

In step 1903, the first device obtain the distance information and determine whether the second device is within a predetermined range. This corresponds to that described in step 1807 in FIG. 18.

In step 1905, the first device may transmit the identification information of the second device to an external server.

According to some embodiments, when the first device determines that the second device is located at a distance within the predetermined range from the first device, the first device may transmit the identification information of the second device to the external server. That is, the first device may selectively transmit the identification information of the second device to the external server based on the distance information with the second device.

In step 1907, the external server may establish a connection with the second device or provide the service to the second device.

According to some embodiments, the external server may establish a separate connection with the second device, or may provide the service over a mobile communication network, such as 3G, 4G, to which the second device is connected. Also, when the connection is established between the first device and the second device, the external server may provide the service to the second device through the first device.

FIG. 20 is a diagram illustrating a procedure in which a third device establishes a connection with a second device through a first device based on distance information.

In step 2001, the third device may authorize a representative authority for connection establishment to the first device.

According to some embodiments, the third device may select one of a plurality of first devices based on a user input and transmit the representative authority for connection establishment.

In step 2003, the first device may broadcast identification information of the first device.

According to some embodiments, the first device may broadcast identification information of the third device. According to some embodiments, the first device may broadcast the identification information of the first device or the identification information of the third device by using each of a first communication method and a second communication method.

In step 2005, the second device may search for a device. This corresponds to description provided in step 1803 of FIG. 18.

In step 2007, the second device may transmit identification information of the second device by using the first communication method and the second communication method. This corresponds to that described above.

In step 2009, the first device may obtain distance information with the second device based on characteristics of the first communication method and the second communication method, and determine whether the second device is a device located within a predetermined range of distance from the first device.

According to some embodiments, the third device may obtain distance information with the second device, and may determine whether to establish a connection with the second device based on the obtained distance information.

In step 2011, the first device may transmit the identification information of the second device to the third device.

According to some embodiments, the first device may transmit the distance information with the third device to the third device. The first device may also transmit to the third device information necessary for establishing the connection with the second device.

The third device may transmit to the first device the information necessary for establishing the connection with the second device to the first device.

In step 2013, the third device may establish the connection with the second device.

Figure 21:
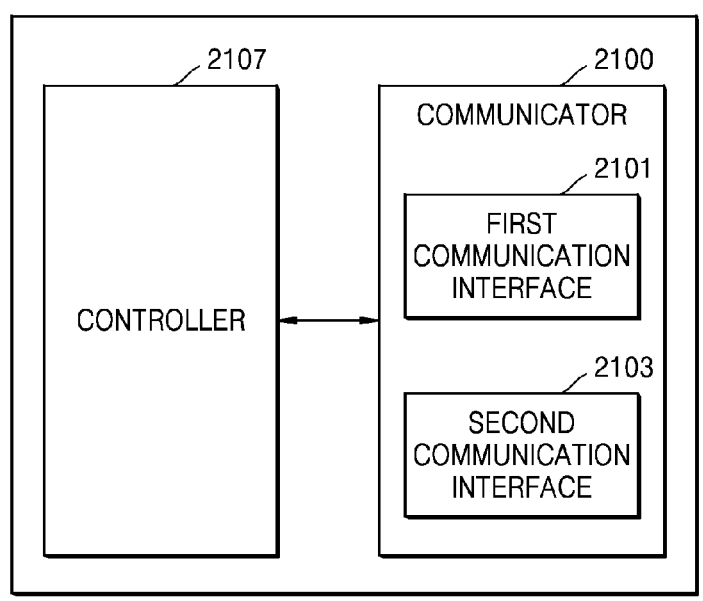
FIGS. 21 and 22 are block diagrams illustrating a device according to some embodiments.
Figure 22:
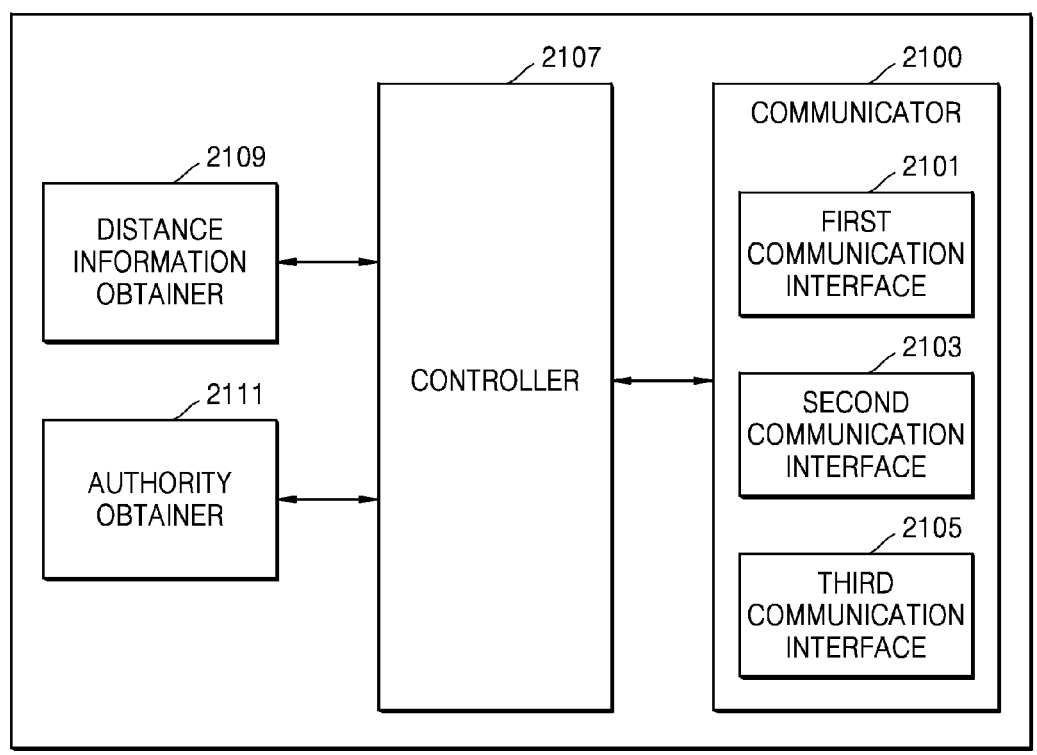

FIGS. 21 and 22 are block diagrams illustrating the first device 101 according to some embodiments.

As shown in FIG. 21, the first device 101 according to some embodiments may include a communicator 2100 including a first communication interface 2101 and a second communication interface 2103 and a controller 2107. However, all of the components shown in FIG. 21 are not essential components of the first device 101. The first device 101 may be implemented by more components than the components shown in FIG. 21, or the first device 101 may be implemented by fewer components than the components shown in FIG. 21.

Also, according to some embodiments, the second device 102 and the third device 103 described above may also have the same configuration as the first device 101.

The communicator 2100 may include the first communication interface 2101 and the second communication interface 2103. The communicator 2100 may further include a third communication interface (not shown), and may include at least one of the first communication interface 2101 and the second communication interface 2103 according to an implementation. In the specification, meaning of the communicator 2100 performing a predetermined operation may be the same as that of performing a predetermined operation through at least one communication interface included in the communicator 2100.

According to some embodiments, the first communication interface 2101 may obtain identification information of the second device 102 by using a first communication method. Also, the second communication interface 2103 may obtain the identification information of the second device 102 by using a second communication method.

Also, according to some embodiments, the communicator 2100 may transmit a connection request to the second device 102. That is, the communicator 2100 may transmit the connection request to the second device 102 by using at least one of the first communication interface 2101 and the second communication interface 2103, and may transmit the connection request to the second device 102 by using the third communication interface (not shown).

According to some embodiments, the communicator 2100 may simultaneously transmit the connection request to the second device by using the first communication interface 2101 and the second communication interface 2103. Also, the communicator 2100 may transmit information necessary for a connection establishment to the second device 102.

According to some embodiments, the communicator 2100 may receive a response to the connection request from the second device 102. The communicator 2100 may also establish the connection with the second device 102 based on the response received from the second device 102.

According to some embodiments, the communicator 2100 may transmit the identification information of the second device 102 to an external server. According to some embodiments, the communicator 2100 may transmit the identification information of the second device to the external server by using at least one communication interface included in the communicator 2100.

Further, according to some embodiments, the communicator 2100 may transmit first key data to the second device 102 and receive third key data from the second device 102. According to some embodiments, the first communication interface 2101 may transmit the first key data by using the first communication method and receive second key data, and the second communication interface 2103 may transmit the first key data and receive the second key data by using the second communication method.

According to some embodiments, the communicator 2100 may establish a connection with the third device 103. Also, the communicator 2100 may obtain a representative authority for connection establishment from the third device 103 in which the connection is established.

Additionally, according to some embodiments, the communicator 2100 may obtain the third key data from the third device 103. According to some embodiments, the first communication interface 2101 may transmit the third key data to the second device 102 through the first communication method and receive fourth key data, and the second communication interface 2103 may transmit the third key data to the second device 102 through the second communication method and receive the fourth key data.

Also, according to some embodiments, the communicator 2100 may periodically obtain distance information with the second device 102 after the connection with the second device 102 is established.

According to some embodiments, the second communication interface 2103 may include a sound input unit and a sound output unit. Also, according to some embodiments, the second communication interface 2103 may communicate using ultrasonic waves. Additionally, according to some embodiments, the second communication interface 2103 may perform communication using directional sound.

The controller 2107 typically controls the overall operation of the first device 101. For example, the controller 2107 may generally control the components included in the first device 101 by executing a program stored in the first device 101. Also, the controller 2107 may include at least one processor.

According to some embodiments, the controller 2107 may obtain first distance information with the second device 102 based on characteristics of the first communication method and the second communication method, and based on the obtained first distance information, determine whether to transmit a connection request to the second device 102.

According to some embodiments, the controller 2107 may obtain the first distance information with the second device 102 based on a time at which the identification information of the second device was obtained by using the first communication method and a time at which the identification information of the second device was obtained by using the second communication method.

According to some embodiments, the controller 2107 may determine whether the second device 102 is located within a predetermined range of distance based on the obtained first distance information.

According to some embodiments, when there are a plurality of second devices, the controller 2107 may compare identification information of each of the plurality of second devices obtained by using the first communication method and identification information of each of the plurality of second devices obtained by using the second communication method and select one of the plurality of second devices based on a result of comparing. The controller 2107 may also select one of the plurality of second devices based on the result of comparing and a user input.

According to some embodiments, the controller 2107 may determine whether the second device 102 is located within the predetermined range of distance based on the obtained first distance information, and determine whether a connection establishment with the second device 102 located within the predetermined range of distance is required based on a service providing method.

According to some embodiments, the controller 2107 may determine whether to establish a connection with the second device 102 based on the first key data and the second key data.

According to some embodiments, the controller 2107 may obtain second distance information with the second device 102 based on a time at which the second key data is received by using the first communication method and a time at which the second key data is obtained nu using the second communication method, compare the obtained first distance information with the second distance information, and determine whether to establish the connection based on a result of comparing.

According to some embodiments, the controller 2107 may determine whether a connection establishment between the second device 102 located within the predetermined range of distance and the third device 103 is required based on the representative authority for connection establishment obtained from the third device 103.

According to some embodiments, the controller 2017 may determine whether to connect the second device 102 and the third device 103 based on the third key data transmitted by the communicator 2100 and the fourth key data received by the communicator 2100.

According to some embodiments, the controller 2107 may release the established connection with the second device 102 based on the distance information obtained periodically by the communicator 2100. For example, when the second device 102 is farther or closer than the predetermined range of distance, the controller 2107 may control the communicator 2100 to release the connection with the second device 102.

As shown in FIG. 22, the first device 101 according to some embodiments may include the communicator 2100 including the first communication interface 2101, the second communication interface 2103, and a third communication interface 2105, the controller 2107, a distance information obtainer 2109, and an authority obtainer 2111. However, all the components shown in FIG. 22 are not essential components of the first device 101. The first device 101 may be implemented by more components than the components shown in FIG. 22, or the first device 101 may be implemented by fewer components than the components shown in FIG. 22.

The communicator 2100 may further include the third communication interface 2105 in addition to the first communication interface 2101 and the second communication interface 2103 as described above. That is, the communicator 2100 may include at least one communication interface 2105. According to some embodiments, the communication interface 2105 may mean including a communication module.

An operation performed by the controller 2107 may correspond to that of FIG. 21. However, some of operations performed by the controller 2107 may be performed by the distance information obtainer 2109 and the authority obtainer 2111.

According to some embodiments, the distance information obtainer 2109 may obtain distance information with the second device 102 based on characteristics of a first communication method and a second communication method. Compared with FIG. 21, the distance information obtainer 2109, instead of the controller 2107, may be configured to obtain the distance information and provide the obtained distance information to the controller 2107.

According to some embodiments, the authority obtainer 2111 may obtain a representative authority for connection establishment from the third device 103. Also, according to some embodiments, the authority obtainer 2111 may store the obtained representative authority for connection establishment. Compared with FIG. 21, the authority obtainer 2111, instead of the controller 2107, may be configured to obtain the representative authority for connection establishment from the third device 103 and provide the controller 2107 with information about the obtained authority.

Figure 23:
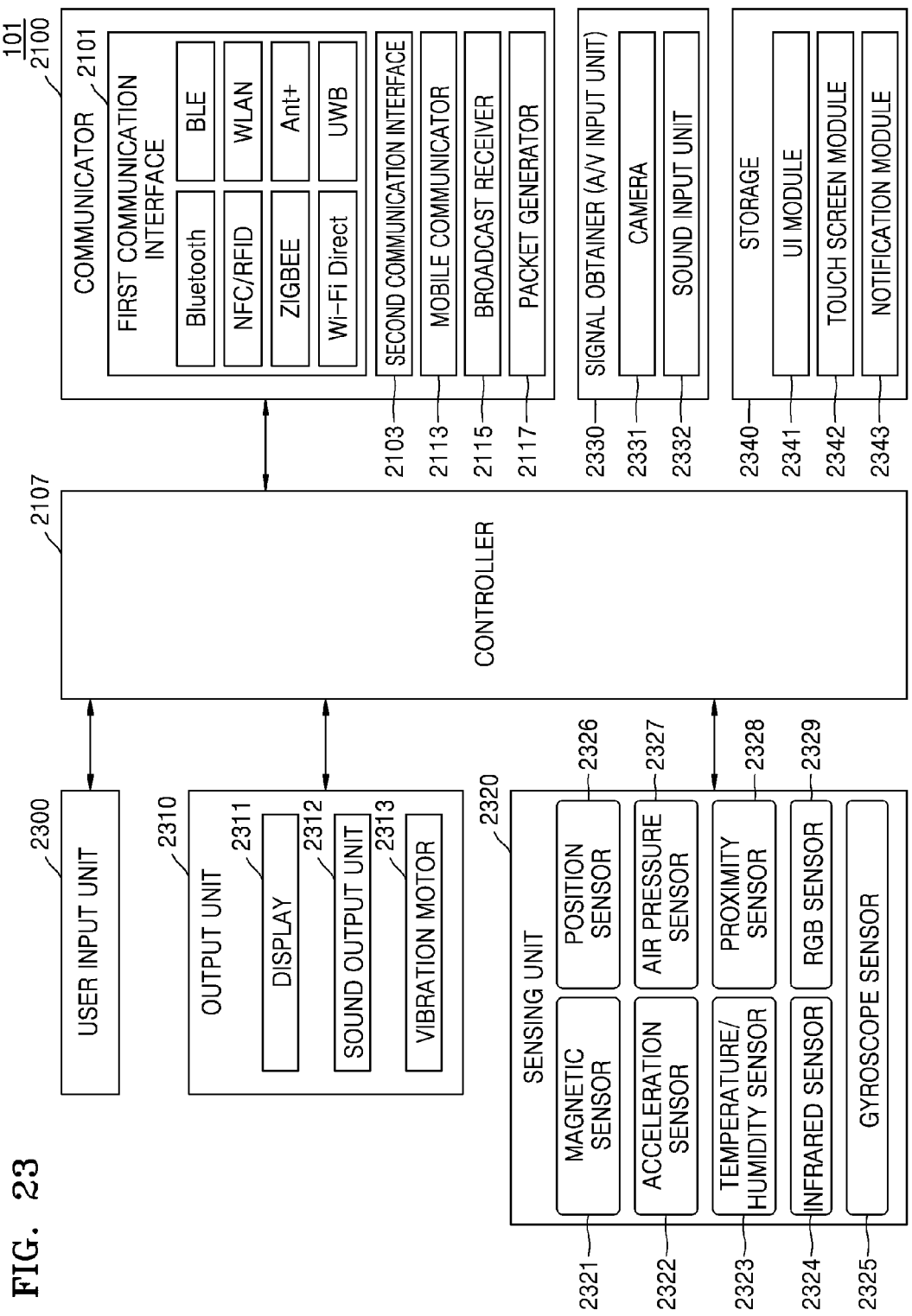
FIG. 23 is a detailed block diagram illustrating a device according to some embodiments.

FIG. 23 is a detailed block diagram illustrating the first device 101 according to some embodiments.

As shown in FIG. 23, the first device 101 according to some embodiments may include a user input unit 2300, an output unit 2310, a sensing unit 2320, an A/V input unit 2330, in addition to the communicator 2100 and the controller 2107.

The communicator 2100 may include one or more components that allow communication between the first device 101 and the second device 102 or an external server. For example, the communicator 2100 may include the first communication interface 2101, the second communication interface 2013, a mobile communicator 2113, a broadcast receiver 2115, and a packet generator 2117.

According to some embodiments, the first communication interface 2101 may be a short range communicator. The first communication interface 2101 may include a Bluetooth communicator, a BLE (Bluetooth Low Energy) communicator, a Near Field Communicator, a WLAN communicator, a Zigbee communicator, an IrDA (infrared data association), a WFD (Wi-Fi Direct) communicator, an UWB (ultra wideband) communicator, an Ant+ communicator, and the like but is not limited thereto.

According to some embodiments, the Ant+ communicator is a communicator that performs wireless communication using a wireless network protocol called ANT having a predetermined standard such as Bluetooth, and is a low power technology based protocol. The ANT protocol is a protocol that allows various types of data such as body information to be stored as a profile and transmitted to other devices and is apparent to those skilled in the art, and thus a detailed description thereof will be omitted. The first communication interface 2101 may communicate with the second device 102 by using a first communication method. This is the same as that described above, and thus a detailed description thereof will be omitted.

The second communication interface 2103 may include an ultrasonic communicator. Also, according to an implementation, the second communication interface 2103 may include a sound input unit 2332 and a sound output unit 2312. That is, the second communication interface 2103 may be an interface for controlling and communicating. Also, according to some embodiments, the second communication interface 2103 may communicate using directional sound. This is the same as that described above, and thus a detailed description thereof will be omitted.

The mobile communicator 2113 transmits and receives a wireless signal to and from at least one of a base station, an external terminal, and a server over a mobile communication network. Here, the wireless signal may include a voice call signal, a video call signal, or various types of data depending on text/multimedia message transmission/reception.

The broadcast receiver 2115 receives a broadcast signal and/or broadcast-related information from outside through a broadcast channel. The broadcast channel may include a satellite channel and a terrestrial channel. The first device 101 may not include the broadcast receiver 2115 according to an implementation.

A storage (memory) 2340 may store a program for processing and control of the controller 2107, and may store data input to or output from the first device 101.

The storage (memory) 2340 may include at least one storage medium of a flash memory type, a hard disk type, a multimedia card micro type, a card type memory (for example, an SD or XD memory), a random access memory (SRAM), a read only memory (ROM), an electrically erasable programmable read-only memory (EEPROM), a programmable read-only memory (PROM), a magnetic memory, a magnetic disk, and an optical disk.

Programs stored in the storage (memory) 2340 may be classified into a plurality of modules according to their functions. For example, the programs may be classified into a UI module 2341, a touch screen module 2342, a notification module 2343, etc.

The UI module 2341 may provide a specialized UI, a GUI, and the like that are interlocked with the first device 101. For example, the UI module 2341 may provide the UI or the GUI so as to distinguish whether the first device 101 performs a procedure of establishing a connection with the second device 102 and whether the first device 101 performs the connection with the second device 102 on behalf of the third device 103.

The touch screen module 2342 may sense a touch gesture on a touch screen of a user and may transmit information about the touch gesture to the controller 2107. The touch screen module 2342 according to some embodiments may recognize and analyze a touch code. The touch screen module 2342 may be configured as separate hardware including a controller.

Various sensors may be provided in or near the touch screen to sense a touch or a proximity touch of the touch screen. An example of a sensor for sensing the touch of the touch screen is a tactile sensor. The tactile sensor is a sensor that senses contact of a specific object to a degree that a person feels or more. The tactile sensor may sense various types of information such as roughness of a contact surface, rigidity of a contact object, temperature of a contact point, etc.

Also, a proximity sensor is an example of a sensor for sensing the touch of the touch screen.

The proximity sensor refers to a sensor that senses presence or absence of an object approaching a predetermined detection surface or in the vicinity thereof without mechanical contact by using force of an electromagnetic field or infrared rays. Examples of the proximity sensor include a transmission type photoelectric sensor, a direct reflection type photoelectric sensor, a mirror reflection type photoelectric sensor, a high frequency oscillation type proximity sensor, a capacitive proximity sensor, a magnetic proximity sensor, an infrared proximity sensor, etc. According to some embodiments, the first device 101 may obtain distance information with the second device 102 through the proximity sensor.

The touch gesture of the user may include a tap, a touch & hold, a double tap, a drag, a panning, a flick, a drag and drop, a swipe, and the like.

The notification module 2343 may generate a signal for notifying occurrence of an event of the device 101. Examples of the event occurred in the first device 101 include call signal reception, message reception, key signal input, schedule notification, and the like. The notification module 2343 may output a notification signal in the form of a video signal through a display 2311, output the notification signal in the form of an audio signal through the sound output unit 2312, or output the notification signal in the form of a vibration signal through a vibration motor 2313. An operation performed by the storage (memory) 2340 corresponds to description provided above, and thus a detailed description thereof will be omitted.

The controller 2107 controls the overall operation of the first device 101. For example, the controller 2107 may generally control components included in the first device 101 by executing a program stored in the first device 101. Since this is the same as described above, a detailed description thereof will be omitted.

The user input unit 2300 refers to means for the user to input data for controlling the first device 101. For example, the user input unit 2300 may include a key pad, a dome switch, a touch pad (contact type capacitance type, pressure type resistive type, infrared ray detection type, surface ultrasonic wave conduction type, tension measuring method, a piezo effect method, etc.), a jog wheel, a jog switch, and the like, but is not limited thereto.

The output unit 2310 may output an audio signal, a video signal, or a vibration signal. The output unit 2310 may include the display 2311, the sound output unit 2312, and the vibration motor 2313.

The display 2311 displays and outputs information processed by the first device 101.

Meanwhile, when the display 2311 and a touch pad have a layer structure and are configured as the touch screen, the display 2311 may be used as an input device in addition to an output device. The display 2311 may include at least one of a liquid crystal display, a thin film transistor-liquid crystal display, an organic light-emitting diode, a flexible display, a 3D display, and an electrophoretic display. According to an implementation of the first device 101, the first device 101 may include two or more displays 2311. At this time, the two or more display 2311 may be arranged to face each other using a hinge.

The sound output unit 2312 outputs audio data received from the communicator 2100 or stored in the storage (memory). The sound output unit 2312 also outputs a sound signal related to a function (e.g., call signal reception sound, message reception sound, and alarm sound) performed by the device 101. The sound output unit 2312 may include a speaker, a buzzer, and the like.

According to some embodiments, the sound output unit 2312 may transmit ultrasonic waves. That is, the sound output unit 2312 may correspond to the second communication interface 2113. This is the same as that described above, and thus a detailed description thereof will be omitted.

The vibration motor 2313 may output a vibration signal. For example, the vibration motor 2313 may output the vibration signal corresponding to an output of audio data or video data (e.g., a call signal reception sound, a message reception sound, etc.). Also, the vibration motor 2313 may output the vibration signal when a touch is input to the touch screen.

The sensing unit 2320 may sense a state of the first device 101 or a state around the first device 101 and may transmit sensed information to the controller 2107.

The sensing unit 2320 may include at least one of a magnetic sensor 2321, an acceleration sensor 2322, a temperature/humidity sensor 2323, an infrared sensor 2324, a gyroscope sensor 2325, a position sensor (e.g. a GPS) 2326, an air pressure sensor 2327, a proximity sensor 2328, and an illuminance sensor 2329 but is not limited thereto. A function of each sensor may be intuitively deduced from the name by a person skilled in the art, and thus a detailed description thereof will be omitted.

According to some embodiments, the sensing unit 2320 may obtain position information of the first device 101 using the sensors. The controller 2107 may obtain distance information of the first device 101 and the second device 102 based on position information of the first device 101 obtained by the sensing unit 2320 and position information of the second device 102 received through the communicator 2100.

The A/V input unit 2330 is for inputting an audio signal or a video signal, and may include a camera 2331 and the sound input unit 2332. The camera 2331 may obtain an image frame such as a still image or a moving image through an image sensor in a video call mode or a photographing mode. An image captured through the image sensor may be processed through the controller 2107 or a separate image processor (not shown).

The image frame processed by the camera 2331 may be stored in the storage (memory) 2340 or transmitted to outside through the communicator 2100. Two or more camera 2331 may be provided according to a configuration of a terminal.

The sound input unit 2332 receives an external sound signal and processes the received sound signal as electrical sound data. According to some embodiments, the sound input unit 2332 may be a microphone, and is not limited to the example described above.

The sound input unit 2332 may receive a sound signal from an external device, a server, or a user. The microphone 2332 may use various noise reduction algorithms for eliminating noise generated in receiving the external sound signal.

Also, according to some embodiments, the sound input unit 2332 may receive ultrasonic waves. That is, the sound input unit 2332 may correspond to the second communication interface 2113. This is the same as that described above, and thus a detailed description thereof will be omitted.

The device described herein may include a processor, a memory for storing and executing program data, a permanent storage such as a disk drive, a communication port for handling communications with external devices, and user interface devices, including a display, keys, etc. When software modules are involved, these software modules may be stored as program instructions or computer readable codes executable on the processor on a computer-readable media such as read-only memory (ROM), random-access memory (RAM), CD-ROMs, magnetic tapes, floppy disks, and optical data storage devices. The computer readable recording medium may also be distributed over network coupled computer systems so that the computer readable code is stored and executed in a distributed fashion. The media may be read by the computer, stored in the memory, and executed by the processor.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the disclosure, reference has been made to the preferred embodiments illustrated in the drawings, and specific language has been used to describe these embodiments. However, no limitation of the scope of the disclosure is intended by this specific language, and the disclosure should be construed to encompass all embodiments that would normally occur to one of ordinary skill in the art.

The present disclosure may be described in terms of functional block components and various processing steps. Such functional blocks may be realized by any number of hardware and/or software components configured to perform the specified functions. For example, the present disclosure may employ various integrated circuit components, e.g., memory elements, processing elements, logic elements, look-up tables, and the like, which may carry out a variety of functions under the control of one or more microprocessors or other control devices. Similarly, where the elements of the present disclosure are implemented using software programming or software elements the disclosure may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the present disclosure could employ any number of conventional techniques for electronics configuration, signal processing and/or control, data processing and the like. The words "mechanism" and "element" are used broadly and are not limited to mechanical or physical embodiments, but may include software routines in conjunction with processors, etc.

The particular implementations shown and described herein are illustrative examples of the disclosure and are not intended to otherwise limit the scope of the disclosure in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the disclosure unless the element is specifically described as "essential" or "critical".

The use of the terms "a" and "an", and "the" and similar referents in the context of describing the disclosure (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein may be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. Numerous modifications and adaptations will be readily apparent to those of ordinary skill in this art without departing from the spirit and scope of the present disclosure.

The invention claimed is:

1. A method performed by a first device to establish a connection to a second device, the method comprising:
    obtaining identification information of the second device by using a first communication method;
    obtaining the identification information of the second device by using a second communication method;
    obtaining first distance information regarding the second device based on characteristics of the first communication method and the second communication method; and
    determining whether to transmit a connection request to the second device based on the obtained first distance information,
    wherein the determining further comprises:
        determining whether the second device is located within a predetermined distance range based on the obtained first distance information;
        determining whether a connection establishment with the second device located within the predetermined distance range is necessary based on a service providing method to be used by the second device; and
        selectively transmitting the identification information of the second device to an external server based on the determining result.

2. The method of claim 1, wherein the obtaining of the first distance information comprises:
    obtaining first distance information regarding the second device based on a time when the identification information of the second device is obtained by using the first communication method and a time when the identification information of the second device is obtained by using the second communication method.

3. The method of claim 1, wherein the determining whether to transmit the connection request comprises:
    determining whether the second device is located within a predetermined distance range based on the obtained first distance information; and
    wherein the selectively transmitting the connection request comprises:
    transmitting the connection request to the second device based on the determining result.

4. The method of claim 3, wherein the determining comprises:
    when the second device is a plurality of second devices, comparing identification information of each of the plurality of second devices obtained by using the first communication method with identification information of each of the plurality of second devices obtained by using the second communication method; and
    selecting one of the plurality of second devices based on a comparing result.

5. The method of claim 3, further comprising:
    receiving a response to the connection request from the second device; and
    establishing a connection to the second device based on the received response.

6. The method of claim 5, wherein the receiving of the response further comprises: transmitting information necessary for a connection establishment to the second device based on the received response.

7. The method of claim 5, wherein the receiving of the response further comprises:
    transmitting first key data to the second device by using each of the first communication method and the second communication method based on the received response; and
    receiving second key data from the second device by using each of the first communication method and the second communication method, and
    wherein the establishing of the connection comprises:
    determining whether to establish a connection to the second device based on the first key data and the second key data.

8. The method of claim 7, wherein the determining whether to establish the connection comprises:
    obtaining second distance information regarding the second device based on a time when the second key data is received by using the first communication method and a time when the second key data is received by using the second communication method;
    comparing the obtained first distance information with the second distance information; and
    determining whether to establish the connection based on a comparing result.

9. The method of claim 1, further comprising:
    obtaining a representative authority for connection establishment from a third device to which a connection is established,
    wherein the determining comprises:
    determining whether a connection establishment between the second device located within a predetermined distance range and the third device is necessary based on the obtained representative authority; and
    selectively transmitting the first distance information and the identification information of the second device to the third device based on a determining result.

10. The method of claim 9, wherein the determining whether the connection establishment between the second device and the third device is necessary comprises:
    obtaining third key data from the third device;
    transmitting the third key data to the second device by using each of the first communication method and the second communication method;
    receiving fourth key data from the second device by using each of the first communication method and the second communication method; and
    determining whether to establish the connection between the second device and the third device based on the third key data and the fourth key data.

11. A method performed by a second device to establish a connection to a first device, the method comprising:
    providing identification information of the second device to the first device by using a first communication method and a second communication method;
    receiving a connection request from the first device by using the first communication method and the second communication method based on the identification information provided by using the first communication method and the second communication method;

obtaining distance information regarding the first device based on characteristics of the first communication method and the second communication method;

determining whether to establish a connection to the first device based on the obtained distance information; and establishing a connection to the first device based on a determining result, wherein the determining further comprises:

determining whether the first device is located within a predetermined distance range based on the obtained first distance information;

determining whether a connection establishment with the first device located within the predetermined distance range is necessary based on a service providing method to be used by the second device; and selectively transmitting the identification information of the second device to an external server based on the determining result.

12. A first device for establishing a connection with a second device, the first device comprising:

a communicator comprising a first communication interface configured to obtain identification information of the second device by using a first communication method and a second communication interface configured to obtain the identification information of the second device by using a second communication method; and a controller configured to obtain first distance information regarding the second device based on characteristics of the first communication method and the second communication method and determine whether to transmit a connection request to the second device based on the obtained first distance information, wherein the controller is further configured to:

determine whether the second device is located within a predetermined distance range based on the obtained first distance information;

determine whether a connection establishment with the second device located within the predetermined distance range is necessary based on a service providing method to be used by the second device; and selectively transmit the identification information of the second device to an external server based on the determining result.

13. The first device of claim 12, wherein the second communication interface is configured to perform ultrasonic waves communication.

14. A non-transitory computer-readable recording medium having recorded thereon a program which, when executed by a computer, performs the method of claim 1.

* * * * *